US011581766B2

(12) United States Patent
Yim et al.

(10) Patent No.: US 11,581,766 B2
(45) Date of Patent: Feb. 14, 2023

(54) DRIVE MOTOR WITH FLUX BARRIERS, AND COMPRESSOR HAVING THE SAME

(71) Applicant: LG Electronics Inc., Seoul (KR)

(72) Inventors: Woogyong Yim, Seoul (KR); Jehoon Kim, Seoul (KR); Ochang Gwon, Seoul (KR); Kyoungjun Park, Seoul (KR)

(73) Assignee: LG Electronics Inc., Seoul (KR)

( * ) Notice: Subject to any disclaimer, the term of this patent is extended or adjusted under 35 U.S.C. 154(b) by 201 days.

(21) Appl. No.: 16/567,754

(22) Filed: Sep. 11, 2019

(65) Prior Publication Data

US 2020/0083768 A1 Mar. 12, 2020

(30) Foreign Application Priority Data

Sep. 11, 2018 (KR) .................. 10-2018-0108541
Sep. 27, 2018 (KR) .................. 10-2018-0115217

(51) Int. Cl.
*H02K 1/276* (2022.01)

(52) U.S. Cl.
CPC .......... *H02K 1/2766* (2013.01); *H02K 1/276* (2013.01)

(58) Field of Classification Search
CPC ........ H02K 1/276; H02K 1/2766; H02K 1/27; H02K 1/2706; H02K 1/272; H02K 1/274; H02K 1/2753; H02K 21/021; H02K 21/028
USPC ..................................................... 310/156.53
See application file for complete search history.

(56) References Cited

U.S. PATENT DOCUMENTS

| | | | | |
|---|---|---|---|---|
| 6,008,559 A | * | 12/1999 | Asano | H02K 1/276 310/216.073 |
| 6,218,753 B1 | * | 4/2001 | Asano | H02K 1/276 310/156.53 |
| 2005/0062354 A1 | * | 3/2005 | Iles-Klumpner | H02K 21/16 310/156.53 |
| 2007/0252467 A1 | * | 11/2007 | Hoemann | H02K 1/276 310/156.53 |
| 2010/0148612 A1 | * | 6/2010 | Takemoto | H02K 29/03 310/156.53 |
| 2017/0294813 A1 | * | 10/2017 | Lim | H02K 3/325 |

(Continued)

FOREIGN PATENT DOCUMENTS

| | | |
|---|---|---|
| EP | 3029808 | 6/2016 |
| JP | 11004555 A * | 1/1999 |

(Continued)

OTHER PUBLICATIONS

Kawamata, Machine Translation of JP11004555, Jan. 1999 (Year: 1999).*

(Continued)

*Primary Examiner* — Eric Johnson
(74) *Attorney, Agent, or Firm* — Fish & Richardson P.C.

(57) ABSTRACT

A drive motor includes a stator having an accommodating space and a rotor rotatably provided in the accommodating space and rotated by a magnetic interaction with the stator, wherein the rotor includes a rotor core into which a magnetic member is inserted and first and second flux barriers formed to penetrate through the rotor core and extending along a circumferential direction of the rotor core from both sides of the magnetic member, wherein a length of the first flux barrier and a length of the second flux barrier are different from each other.

6 Claims, 14 Drawing Sheets

(56) References Cited

U.S. PATENT DOCUMENTS

| | | | | |
|---|---|---|---|---|
| 2018/0205274 A1* | 7/2018 | Heo | ......................... | H02K 1/24 |
| 2019/0052137 A1* | 2/2019 | Yabe | ....................... | F04C 18/02 |
| 2019/0379248 A1* | 12/2019 | Yoon | ....................... | F04B 35/04 |

FOREIGN PATENT DOCUMENTS

| | | | | | |
|---|---|---|---|---|---|
| JP | 2002335643 A | * | 11/2002 | | |
| JP | 2009038930 | | 2/2009 | | |
| JP | 2010110142 | | 5/2010 | | |
| JP | 2010154676 A | * | 7/2010 | ........... | H02K 1/2766 |
| JP | 2010206882 A | * | 9/2010 | | |
| JP | 2011223742 A | * | 11/2011 | | |
| JP | 2012100428 | | 5/2012 | | |
| JP | 2013183574 A | * | 9/2013 | | |
| KR | 20060064301 A | * | 6/2006 | | |
| KR | 20120078387 | | 7/2012 | | |
| KR | 20150115319 | | 10/2015 | | |
| KR | 20180091278 | | 8/2018 | | |
| WO | WO-2019026979 A1 | * | 2/2019 | ............... | H02K 1/27 |

OTHER PUBLICATIONS

Takahashi, Machine Translation of WO2019026979, Feb. 2019 (Year: 2019).*
Extended European Search Report in European Application No. 19196652.2, dated Dec. 9, 2019, 7 pages.

* cited by examiner

DRIVE MOTOR WITH FLUX BARRIERS, AND COMPRESSOR HAVING THE SAME

CROSS-REFERENCE TO RELATED APPLICATION

Pursuant to 35 U.S.C. § 119(a), this application claims the benefit of earlier filing date and right of priority to Korean Application No. 10-2018-0108541, filed on Sep. 11, 2018, and Korean Application No. 10-2018-0115217, filed on Sep. 27, 2018, the contents of which are incorporated by reference herein in their entirety.

BACKGROUND OF THE DISCLOSURE

1. Field of the Disclosure

The present disclosure relates to a drive motor for driving an electric compressor.

2. Background of the Disclosure

In general, a compressor that serves to compress a refrigerant in a vehicle air-conditioning system has been developed in various forms, and in recent years, an electric compressor driven by electricity using a motor has been actively developed as the automobile parts become electronic/electric parts.

Among various compression methods, an electric compressor mainly adopts a scroll compression method suitable for a high compression ratio operation. In such a scroll-type electric compressor, a drive motor is installed in a sealed casing and a compression unit including a fixed scroll and an orbiting scroll is installed on one side of the drive motor. In addition, the drive motor and the compression unit are connected to a rotating shaft so that a rotational force of the drive motor is transmitted to the compression unit.

The rotational force transmitted to the compression unit allows the orbiting scroll to perform an orbiting motion with respect to the fixed scroll to form a pair of two compression chambers including a suction chamber, an intermediate pressure chamber, and a discharge chamber, and a refrigerant is sucked into both compression chambers and compressed and discharged at the same time to form a desired pressure.

The drive motor generally includes a stator which is fixed inside the casing and generates a magnetic field by a current applied thereto and a rotor which is rotatably received by the stator and rotated by a magnetic interaction with the stator. The rotating shaft is coupled to the center of the rotor, and the rotating shaft is mounted eccentrically on the orbiting scroll to compress the refrigerant by enabling the orbiting scroll to make an orbiting movement.

Efficiency of the compressor is directly related to efficiency of the drive motor, and in order to increase the efficiency of the drive motor, a technique of mounting a magnetic member such as a permanent magnet on the rotor has been proposed. This technology may increase the efficiency of the motor by using a magnet torque generated by the magnetic member.

However, due to the characteristics of the magnetic member, a magnetic flux is concentrated at both ends of the magnetic member, and when the motor is driven by the concentrated magnetic flux, torque ripple occurs. As a method for reducing such a torque ripple, a technique of forming a flux barrier on both sides of the magnetic member has been proposed.

Typically, as the magnetic member inserted into the electric compressor, a bar-type magnet is used, and flux barriers are formed at both ends of the magnetic member, respectively. Here, the bar-type magnet is designed to increase magnetic resistance (permeance), and as part of the design, the magnetic member is manufactured to have a preset width.

However, the magnetic member, such as a permanent magnet corresponds to a relatively expensive material, thereby causing an increase in a manufacturing cost of the compressor.

In addition, Patent Document 1 (KR 10-2018-0091278 A) of a related art document discloses a technology in which a flux barrier formed of an air gap is formed in a circumferential direction and a length of a bridge of an outer portion of the flux barrier extends to maintain physical rigidity, while reducing leakage of a magnetic flux. Patent document 2 (KR 10-2015-0115319 A) discloses a technology in which inner and outer lines of a flux barrier extending in a circumferential direction extend in parallel with an outer circumference of a rotor core to improve torque ripple and enhance strength of magnet torque.

In both Patent Document 1 and Patent Document 2, the flux barriers formed of air gaps formed on both sides of the magnet are formed symmetrically with respect to an imaginary line connecting the center of the magnet to the center of the rotor core.

However, in a rotor structure of the drive motor of the related art described above, as the rotor rotates in one direction, a flux path is biased in a direction opposite to the rotation direction. In this case, as the magnetic flux is concentrated on one region, the torque ripple due to the driving of the drive motor increases, thereby causing a problem that efficiency of the drive motor is reduced. In addition, a magnetic flux density becomes unbalanced, and as a result, the magnetic flux flowing in the rotor core may be canceled out. In this case, an output of the designed drive motor is reduced.

RELATED ART DOCUMENT

Patent Document

Patent document 1: Korean Laid-open Publication No. 10-2018-0091278 (2018.08.16)
Patent document 2: Korean Laid-open Publication No. 10-2015-0115319 (2015.10.14)

SUMMARY OF THE DISCLOSURE

Therefore, an aspect of the detailed description is to provide a structure of a drive motor capable of increasing efficiency of the drive motor by improving a structure of a rotor in the drive motor.

Another aspect of the detailed description is to provide a structure of a drive motor capable of preventing a reduction in efficiency of the drive motor by preventing a phenomenon that a magnetic flux density is concentrated as a flux path is biased according to rotation of a rotor in one direction.

Another aspect of the detailed description is to provide a structure of a drive motor capable of reducing a torque ripple phenomenon by alleviating a phenomenon that a magnetic flux density is concentrated as a flux path is biased according to rotation of a rotor in one direction.

Another aspect of the detailed description is to provide a structure capable of increasing reliability of a drive motor by providing an improved rotor structure.

Another aspect of the detailed description is to provide an electric compressor including the drive motor in accordance with the structure described above.

Another aspect of the detailed description is to provide a structure of a drive motor capable of reducing a material cost of the drive motor by reducing a thickness of a magnet arranged in a region where a flux barrier is formed in consideration of the fact that a magnet arranged in a region where the flux barrier is formed has a high demagnetization internal force as compared with a magnet arranged in a region where the flux barrier is not formed in a structure of a rotor where the flux barrier is formed.

Another aspect of the detailed description is to provide a structure of a drive motor capable of preventing vibration of a magnet inserted into an insertion recess due to rotation of a rotor.

Another aspect of the detailed description is to provide a structure of a drive motor capable of maintaining reliability and durability of the drive motor by preventing magnetic members from being damaged by collisions with each other.

Another aspect of the detailed description is to provide an electric compressor capable of increasing efficiency, while being reduced in weight, by having the drive motor described above.

To achieve these and other advantages and in accordance with the purpose of this specification, as embodied and broadly described herein, a drive motor includes: a stator having an accommodating space; and a rotor rotatably provided in the accommodating space and rotated by a magnetic interaction with the stator, wherein the rotor includes a rotor core into which a magnetic member is inserted; and first and second flux barriers formed to penetrate through the rotor core and extending along a circumferential direction of the rotor core from both sides of the magnetic member, wherein a length of the first flux barrier and a length of the second flux barrier are different from each other.

Here, the first flux barrier and the second flux barrier may be sequentially arranged along a rotation direction of the rotor core, the first flux barrier may extend along the rotation direction of the rotor, and the second flux barrier may extend in a direction opposite to the rotation direction of the rotor.

Here, the first and second flux barriers may be formed in plurality along an outer circumferential direction of the rotor core.

In addition, the second flux barrier may extend longer than the first flux barrier. Here, an angle between one end and the other end of the first flux barrier with respect to a center of the rotor core may be 8 degrees to 12 degrees, and an angle between one end and the other end of the second flux barrier with respect to the center of the rotor core may be 13 degrees to 17 degrees.

Alternatively, the first flux barrier may extend longer than the second flux barrier. Here, an angle between one end and the other end of the first flux barrier with respect to the center of the rotor core may be 13 degrees to 17 degrees, and an angle between one end and the other end of the second flux barrier with respect to the center of the rotor core may be 8 degrees to 12 degrees.

In addition, according to the present invention, each of the first and second flux barriers may include an inner surface and an outer surface facing each other, and the inner surface and the outer surface may extend in parallel.

In addition, according to the present invention, the rotor core may include an opening extending from an insertion recess into which the magnetic member is inserted and surrounding at least a portion of both side surfaces of the magnetic member.

Each of the first and second flux barriers may be connected to the opening.

To achieve these and other advantages and in accordance with the purpose of this specification, as embodied and broadly described herein, a drive motor includes: a stator and a rotor provided to be rotated by a magnetic interaction with the stator, wherein the rotor may include a rotor core having a through hole penetrating along an axial direction, a magnetic member may be inserted into the through hole, and the through hole may include an inner side surface in contact with one surface of the magnetic member and an outer side surface extending to be parallel to an outer circumferential surface of the rotor core. Here, the outer side surface may have a magnetic member support portion protruding to be in contact with the other surface of the magnetic member, and the magnetic member support portion may be formed to be biased along an outer circumferential direction.

Here, the magnetic member support portion may be formed to have a preset width along the outer circumferential direction and may include a magnetic member support protrusion protruding from both sides of the magnetic member support portion. The magnetic member support protrusion may include a first support protrusion and a second support protrusion which protrude to be spaced apart from the outer side surface so as to form first and second flux barriers, respectively.

Here, the first flux barrier and the second flux barrier may be sequentially arranged along the rotation direction of the rotor.

In addition, the magnetic member support portion may be formed to be biased in a direction opposite to the rotation direction of the rotor with respect to a center of the through hole. Here, a protruding length of the second support protrusion may be longer than a protruding length of the first support protrusion.

Alternatively, the magnetic member support portion may be formed to be biased in the rotation direction of the rotor with respect to the center of the through hole. Here, a protruding length of the first support protrusion may be longer than a protruding length of the second support protrusion.

To achieve these and other advantages and in accordance with the purpose of this specification, as embodied and broadly described herein, a drive motor includes: a stator and a rotor provided to be rotated by a magnetic interaction with the stator, wherein the rotor includes a rotor core into which a magnetic member is inserted; and first and second flux barriers extending toward each other along an outer circumferential direction of the rotor core from both sides of the magnetic member and having a first surface and a second surface facing in mutually opposite directions, wherein a first line connecting a center of the rotor core and a center between the first surface and the second surface may not be aligned with a second line connecting the center of the rotor core and a center of the magnetic member.

In addition, the first line and the second line may form a preset angle. Here, the preset angle may be 0.5 degrees to 3 degrees.

The preset angle may be formed along the rotation direction of the rotor with respect to the second line. Alternatively, the preset angle may be formed along a direction opposite to the rotation direction of the rotor with respect to the second line.

An electric compressor according to the present invention may include the drive motor described above.

The electric compressor according to the present invention may include a casing forming an accommodating space therein, a drive motor provided in the accommodating space, a first scroll performing an orbiting motion by a rotational force of the drive motor to compress a refrigerant and a second scroll coupled with the first scroll to form a pair of two compression chambers, and a rotating shaft coupled to the rotor and eccentrically mounted on the first scroll to provide the rotational force of the drive motor to the first scroll.

In the drive motor according to the present invention, a plurality of magnetic members may be inserted into one magnetic member accommodating recess, and a thickness of the magnetic members arranged on both sides may be smaller than a thickness of the magnetic member arranged at a central portion.

A drive motor according to the present invention may include a stator forming an accommodating space therein and a rotor rotatably provided in the accommodating space and rotated by a magnetic interaction with the stator, wherein the rotor may include a rotor core in which flux barriers are formed and a magnetic portion inserted into an insertion recess formed to be adjacent to the flux barriers and generating a magnetic field, and the magnetic portion may include a first magnetic member at least partially overlapping the flux barriers in a radial direction and a second magnetic member formed to be thicker than the first magnetic member.

Here, the insertion recess may extend in a second direction perpendicular to a first direction parallel to the radial direction at the center of the insertion recess, and a thickness of the second magnetic member in the first direction may be longer than a thickness of the first magnetic member in the first direction.

Here, the first magnetic member may extend in the second direction so as to overlap the flux barrier in the first direction.

Here, the first magnetic member may be provided on both sides of the second magnetic member.

In addition, the insertion recess may be divided into a first region where the first magnetic member is provided and a second region where the second magnetic member is provided, and a width of the second region in the first direction may be larger than a width of the first region in the first direction so as to correspond to each of the thicknesses of the first and second magnetic members.

In addition, the insertion recess may include a first surface and a second surface facing each other and extending in the second direction, and the first surface and the second surface may be formed to be stepped along the second direction. The first magnetic member and the second magnetic member may be arranged to form an uneven shape.

In addition, according to the present invention, the first magnetic member and the second magnetic member may be spaced apart from each other.

Here, the insertion recess may include a spacing protrusion protruding from the first surface or the second surface and arranged between the first magnetic member and the second magnetic member.

In addition, according to another embodiment of the present invention, the drive motor may further include a spacing member disposed between the first magnetic member and the second magnetic member. Here, the spacing member may be formed of a non-magnetic material or a paramagnetic material.

According to the present invention, the insertion recess may include a first insertion recess into which the first magnetic member is inserted and a second insertion recess into which the second magnetic member is inserted, and the first insertion recess and the second insertion recess may be spaced apart from each other along the second direction.

Meanwhile, the insertion recess may be formed in plurality along an outer circumferential direction of the rotor core, the magnetic portion may be inserted into each of the plurality of insertion recesses.

According to another aspect of the present invention, a drive motor may include a stator having an accommodating space therein and a rotor rotatably provided in the accommodating space and rotated by a magnetic interaction with the stator, wherein the rotor includes a rotor core in which flux barriers are formed and an odd number of magnetic members inserted in an insertion recess formed adjacent to the flux barriers and generating a magnetic field, wherein a thickness of magnetic members disposed on both sides of the magnetic member arranged at the center of the insertion recess may be sequentially reduced.

Here, the insertion recess may extend in a first direction perpendicular to a radial direction with respect to the center thereof. The insertion recess may include a first surface and a second surface facing each other and extending in the first direction, and the first surface and the second surface may be formed to be stepped to correspond to the plurality of magnetic members sequentially reduced in thickness.

Here, at least some of the plurality of magnetic members may overlap the flux barriers in a direction parallel to the radial direction at the center of the insertion recess.

In addition, the plurality of magnetic members may be spaced apart from each other at preset intervals.

An electric compressor according to the present invention may include a casing forming an accommodating space therein, the drive motor according to the present invention provided in the accommodating space, a first scroll performing an orbiting motion by a rotational force of the drive motor to compress a refrigerant and a second scroll coupled with the first scroll to form a pair of two compression chambers, and a rotating shaft coupled to the rotor and eccentrically mounted on the first scroll to provide the rotational force of the drive motor to the first scroll.

According to the present invention, since flux barriers formed on both end portions of the magnetic member are formed asymmetrically, an efficiency reduction and a torque ripple phenomenon that occur due to a magnetic flux path biased in a direction opposite to the rotation direction of the rotor as the rotor is driven in one direction may be alleviated.

According to the present invention, an area of a region where a magnetic flux density is concentrated is reduced according to rotation of the drive motor in one direction. Therefore, copper loss may be reduced due to improvement of characteristics according to a B-H curve of a drive motor 1300, and thus efficiency of the drive motor may be increased.

In addition, according to the present invention, as the area of the region where the magnetic flux density is concentrated increases, a region where a magnetic path is formed increases. As a result, a phenomenon in which the magnetic flux density is concentrated may be alleviated, thereby reducing a torque ripple phenomenon.

In addition, according to the present invention, since the thickness of the first magnetic member disposed to overlap the first flux barrier in the radial direction may be smaller than the thickness of the second magnetic member, a use amount of the magnet may be reduced by the reduced thickness of the first magnetic member. Therefore, a material cost of the drive motor may be reduced, and further, a manufacturing cost of the compressor may be reduced. In addition, the weight of the rotor may be reduced, so that efficiency of the drive motor may be increased, which contributes to a reduction in weight of the electric compressor.

Also, since the plurality of magnet members are inserted into one insertion recess, loss due to an eddy current in the magnet that occurs due to a magnetic interaction during operation of the drive motor may be reduced. As a result, efficiency of the drive motor may be increased.

In addition, according to the present invention, since the magnetic member accommodating recess is formed to surround the magnetic members having different widths from each other, it is possible to limit vibration and movement of the plurality of magnets during rotation of the rotor according to the operation of the drive motor, whereby friction between the magnetic member accommodating recess and the magnet and a demagnetization phenomenon caused by heat generated by the friction may be alleviated.

In addition, according to the present invention, by separating the plurality of magnetic members, it is possible to prevent damage due to a collision between the magnetic members. In addition, the demagnetization characteristics due to a mutual influence of a magnetic field of each magnetic member may be weakened.

Further scope of applicability of the present application will become more apparent from the detailed description given hereinafter. However, it should be understood that the detailed description and specific examples, while indicating preferred embodiments of the disclosure, are given by way of illustration only, since various changes and modifications within the spirit and scope of the disclosure will become apparent to those skilled in the art from the detailed description.

DETAILED DESCRIPTION OF THE DISCLOSURE

Hereinafter, description will be given in more detail of a motor-operated compressor according to the present disclosure, with reference to the accompanying drawings.

For the sake of brief description with reference to the drawings, the same or equivalent components will be provided with the same reference numbers, and description thereof will not be repeated.

It will be understood that when an element is referred to as being "connected with" another element, the element can be connected with the another element or intervening elements may also be present. In contrast, when an element is referred to as being "directly connected with" another element, there are no intervening elements present.

A singular representation may include a plural representation unless it represents a definitely different meaning from the context.

Figure 1:
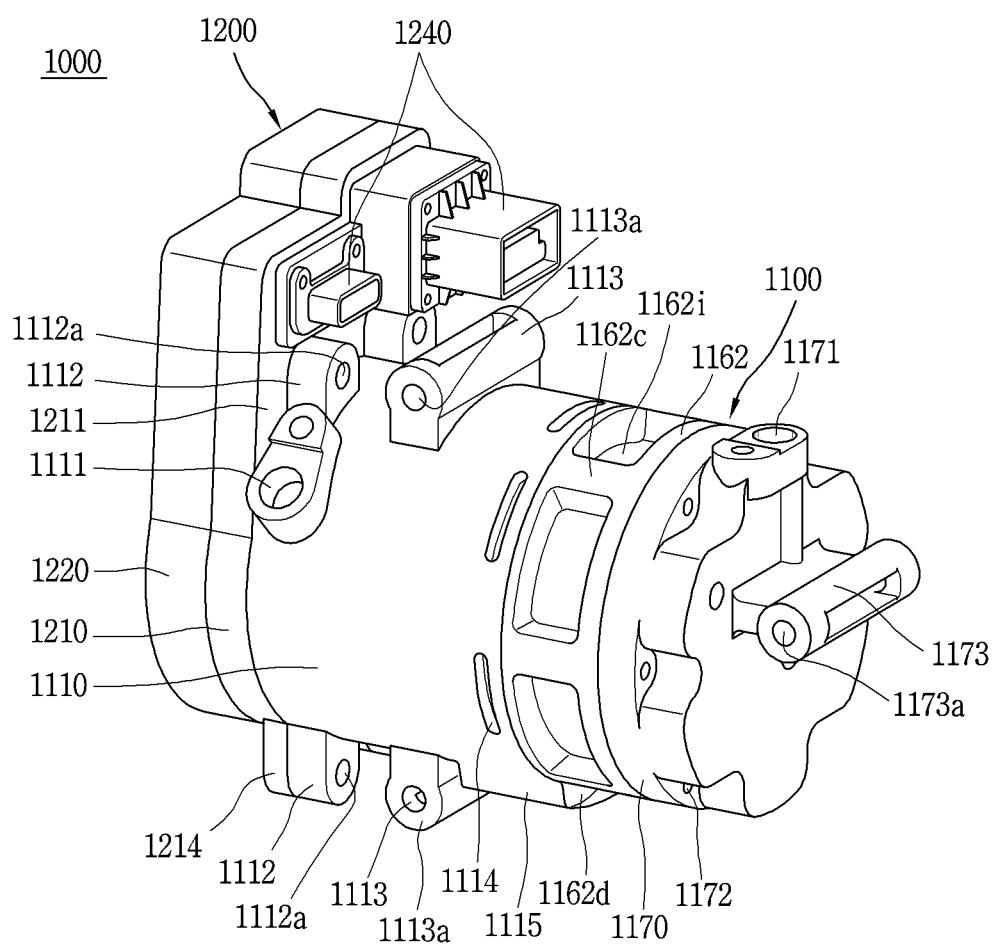
FIG. 1 is a perspective view showing an appearance of the electric compressor provided in the present invention.

FIG. 1 is a perspective view showing an appearance of an electric compressor 1000 provided in the present invention.

The electric compressor 1000 includes a compressor module 1100 and an inverter module 1200.

The compressor module 1100 refers to a collection of components for compressing a fluid such as a refrigerant. The inverter module 1200 refers to a collection of components for controlling driving of the compressor module 1100. The inverter module 1200 may be coupled to one side of the compressor module 1100. If a direction is set based on a flow of the fluid compressed by the electric compressor 1000, one side of the compressor module 1100 refers to a front side of the compressor module 1100. Since the fluid is introduced into an intake port 1111 and discharged to a discharge port 1171, the inverter module 1200 disposed close to the intake port 1111 may be described as being coupled to the front side of the compressor module 1100.

An appearance of the compressor module 1100 may be formed by a main housing 1110, a second scroll 1162, and a rear housing 1170.

The main housing 1110 has an appearance corresponding to a hollow cylinder, a polygonal pillar, or the like. The main housing 1110 may be arranged to extend transversely with respect to the ground. Both ends of the main housing 1110 may be entirely or partially opened. Specifically, a front end of the main housing 1110 is opened and a rear end of the main housing 1110 is partially opened.

The intake port 1111, a main housing side fastening portion 1112, a main housing side fixing portion 1113, and the like are formed on an outer circumferential surface of the main housing 1110.

The intake port 1111 forms a flow path for supplying a fluid to be compressed into an internal space of the electric compressor 1000. The intake port 1111 may protrude from an outer circumferential surface of the main housing 1110. The intake port 1111 may be connected to a suction pipe (not shown) supplying the fluid to be compressed to the electric compressor 1000. The intake port 1111 has a shape corresponding to the suction pipe so as to be coupled to the suction pipe.

The main housing side fastening portion 1112 is a structure for coupling the compressor module 1100 to the inverter module 1200. The main housing side fastening portion 1112 may protrude from an outer circumferential surface of the main housing 1110. The main housing side fastening portion 1112 may be formed in plural along the outer circumferential surface of the main housing 1110. The plurality of main housing side fastening portions 1112 may be spaced apart from each other. A fastening hole 1112a for fastening a bolt is formed at the main housing side fastening portions 1112. The main housing side fastening portion 1112 may be bolted to an inverter housing 1210 of the inverter module 1200 through the fastening hole 1112a or may be bolted to an inverter housing side fastening portion 1214 formed at the inverter housing 1210.

The main housing side fixing portion 1113 is a structure for fixing the electric compressor 1000. The main housing side fixing portion 1113 may protrude from the outer circumferential surface of the main housing 1110. The main housing side fixing portion 1113 may extend along an outer circumferential surface of the main housing 1110. The main housing side fixing portion 1113 may include a fixing hole 1113a that may be coupled to a certain fastening member. The fixing hole 1113a may be opened toward a direction perpendicular to an axial direction of a rotating shaft 1130 (see FIG. 3), which will be described later. Here, the axial direction refers to an extension direction of the rotating shaft 1130. The main housing side fixing portion 1113 may be formed on one side and the other side of the main housing 1110, respectively. For example, in FIG. 1, the main housing side fixing portion 1113 is formed above and below the main housing 1110.

A weight loss recess 1114 may be formed on an outer circumferential surface of the main housing 1110. The weight loss recess 1114 may be formed in plural along the outer circumferential surface of the main housing 1110. The plurality of weight loss recess 1114 may be spaced apart from each other. The weight loss recess 1114 serves to reduce a weight of the main housing 1110.

A first protrusion 1115 may be formed on an outer circumferential surface of the main housing 1110. The first protrusion 1115 may extend in an axial direction or a direction parallel to the axial direction on the outer circumferential surface of the main housing 1110. A first flow path 1115a (see FIG. 3) communicating with a motor chamber S1 (see FIG. 2) may be formed in the first protrusion 1115.

The second scroll 1162 is installed on the other side of the main housing 1110 or the rear side of the main housing 1110. A side wall portion 1162c of the second scroll 1162 may be formed to correspond to the outer circumferential surface of the main housing 1110. Unlike the example shown in FIG. 1, the second scroll 1162 may be installed inside the main housing 1110.

An outer circumferential surface of the second scroll 1162, like the main housing 1110, may have a weight loss recess 1162i. The weight loss recess 1162i formed on the outer circumferential surface of the second scroll 1162 may be formed in plural. The plurality of weight loss recesses 1162i may be spaced apart from each other. The weight loss recess 1162i serves to reduce a weight of the second scroll 1162.

The rear housing 1170 is installed on the other side of the second scroll 1162 or a rear side of the second scroll 1162. The rear housing 1170 may be formed to cover the rear side of the second scroll 1162.

The rear housing 1170 includes a discharge port 1171, a fastening hole 1172, and a fixing portion 1173.

The discharge port 1171 forms a flow path for discharging the fluid compressed in the electric compressor 1000 to the outside. The discharge port 1171 may protrude from the outer circumferential surface of the rear housing 1170. The discharge port 1171 may be connected to a discharge pipe (not shown) for supplying the compressed fluid to a next device of a refrigeration cycle. The discharge port 1171 has a shape corresponding to the discharge pipe so as to be coupled to the discharge pipe.

The fastening hole 1172 may be formed in plural. The plurality of fastening holes 1172 are spaced apart from each other along the circumference of the rear housing 1170. The rear housing 1170 may be bolted to the second scroll 1162 through the fastening hole 1172.

A side surface of the rear housing 1170 includes two portions that form a step. A portion where the fastening hole 1172 is formed may form a step with another portion of the rear housing 1170. The step is repeatedly formed along the outer circumferential surface of the rear housing 1170. The portion where the fastening hole 1172 is formed is disposed closer to the second scroll 1162 than the other portion. Accordingly, a bolt inserted into the fastening hole 1172 may have a relatively short length.

The fixing portion 1173 is a structure for fixing the electric compressor 1000. The fixing portion 1173 is the same as or similar to the fixing portion 1113 formed in the main housing 1110. The fixing portion 1173 of the rear housing 1170 may protrude from the outer circumferential surface of the rear housing 1170. The fixing portion 1173 may extend along the side surface of the rear housing 1170. The fixing portion 1173 may include a fixing hole 1173a that may be coupled to a certain fastening member. The fixing hole 1173a may be opened toward a direction perpendicular to the axial direction of the rotating shaft 1130 which will be described later.

The appearance of the inverter module 1200 is formed by the inverter housing 1210 and an inverter cover 1220.

The inverter housing 1210 is coupled to the opposite side of the rear housing, that is, a front end forming an opening end of the main housing 1110, among both ends of the main housing 1110, to cover a front end opening of the main housing 1110. The inverter housing 1210 may have a larger outer circumferential surface than the main housing 1110. Accordingly, the inverter housing 1210 may have a shape protruding from the main housing 1110. In FIG. 1, the inverter housing 1210 is shown to have a shape protruding upward from the main housing 1110.

The inverter housing 1210 includes an inverter housing side fastening portion 1214 and a connector portion 1240. The inverter housing side fastening portion 1214 is a stricture for coupling the inverter module 1200 with the compressor module 1100. The inverter housing side fastening portion 1214 may protrude from an outer circumferential surface of the inverter housing 1210. The inverter housing side fastening portion 1214 may be formed in plural along the outer circumferential surface of the inverter housing 1210. The plurality of inverter housing side fastening portions 1214 may be disposed to be spaced apart from each other. A fastening hole 1214a (see FIG. 2) for fastening a bolt is formed at the inverter housing side fastening portion 1214. The inverter housing side fastening portion 1214 may be bolted to the main housing 1110 of the compressor module 1100 through the fastening hole 1214*a*.

The main housing side fastening portion 1112 may be bolted to the outer surface 1211 of the inverter housing 1210.

The connector portion 1240 is installed to provide power to an inverter component 1230 (see FIG. 2) installed in the inverter module 1200 and/or a drive motor 1120 installed in the compressor module 1100. The inverter component 1230 is a concept including an electric component such as a printed circuit board (PCB) and an inverter device. The connector portion 1240 may be physically and electrically connected to a counterpart connector (not shown). Power supplied through the counterpart connector is provided to the inverter component 1230 and/or the drive motor 1120 through the connector portion 1240.

The inverter cover 1220 may have an outer circumferential surface that is substantially the same as the inverter housing 1210. The inverter cover 1220 and the inverter housing 1210 are coupled to each other along the circumference thereof to accommodate the inverter component 1230 therein.

Figure 2:
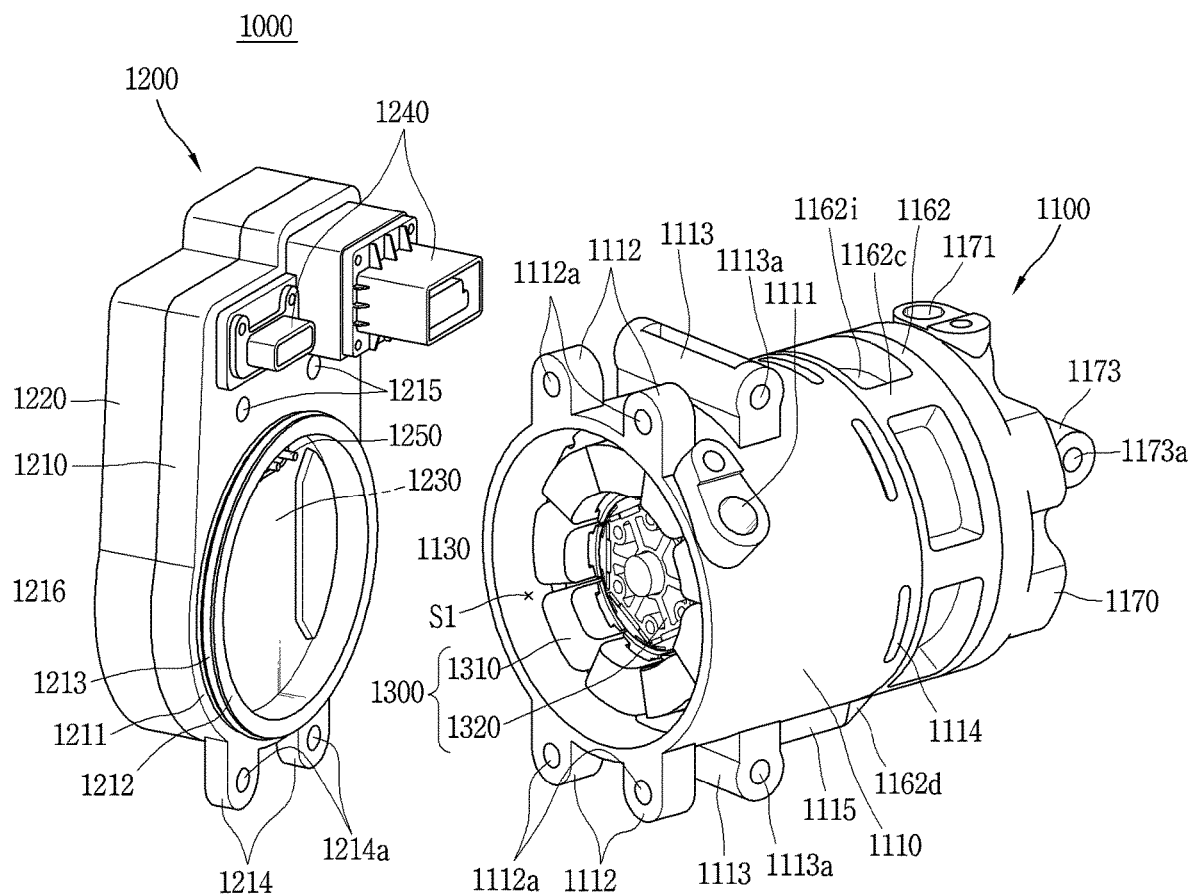
FIG. 2 is an exploded perspective view illustrating a compressor module and an inverter module separated in the electric compressor shown in FIG. 1.

FIG. 2 is an exploded perspective view illustrating the compressor module 1100 and the inverter module 1200 separated in the electric compressor 1000 shown in FIG. 1.

When the compressor module 1100 and the inverter module 1200 are separated from each other, a motor chamber S1 is visually exposed.

The motor chamber S1 is formed by coupling the main housing 1110 and the inverter housing 1210. The motor chamber S1 refers to a space in which the drive motor 1120 is installed. A sealing member 1213 such as an O-ring may be installed along a coupling position of the main housing 1110 and the inverter housing 1210 to seal the motor chamber S1.

The drive motor 1120 is installed in the motor chamber S1. The drive motor 1120 includes a stator 1121 and a rotor 1122.

The stator 1121 is installed along an inner circumferential surface of the main housing 1110 and is fixed to the inner circumferential surface of the main housing 1110. The stator 1121 is inserted into and fixed to the main housing 1110 by shrinkage fitting (or hot pressing). Therefore, an insertion depth of the stator 1121 inserted into the main housing 1110 is advantageously set to be small (thin) to ensure ease of an assembly operation of the stator 1121. In addition, the insertion depth of the stator 1121 is advantageously set to be small to maintain concentricity of the stator 1121 in the shrinkage fitting process.

The rotor 1122 is installed in a region surrounded by the stator 1121. The rotor 1122 is rotated by an electromagnetic interaction with the stator 1121.

The rotating shaft 1130 is coupled to the center of the rotor 1122. The rotating shaft 1130 rotates together with the rotor 1122 and transmits a rotational force generated by the drive motor 1120 to the compression unit 1160 (see FIG. 3) which will be described later. The rotating shaft 1130 is inserted into and fixed to the rotor 1122 by shrinkage fitting (or hot pressing). Hereinafter, specific contents will be described later.

The inverter housing 1210 includes an electrical connection portion 1250 exposed toward the motor chamber S1. The electrical connection portion 1250 is electrically connected to a PCB of the inverter module 1200. The electrical connection portion 1250 may be formed to provide power to the drive motor 1120.

The outer surface 1211 of the inverter housing 1210 may have a fastening hole 1215 facing the main housing side fastening portion 1112. The main housing side fastening portion 1112 and the fastening hole 1215 may be bolted to each other. In addition, as described above, the inverter housing side fastening portion 1214 may have a fastening hole 1214*a* to correspond to the main housing side fastening portion 1112. Accordingly, the main housing side fastening portion 1112 and the inverter housing side fastening portion 1214 may be bolted to each other.

A sealing protrusion 1212 may protrude from an outer surface of the inverter housing 1210. A circumference of the sealing protrusion 1212 may have a shape corresponding to the circumference of the main housing 1110. For example, the sealing protrusion 1212 may protrude in a circular shape, and an inner circumferential surface of the sealing protrusion 1212 may be formed to contact an inner circumferential surface of the opening end of the main housing 1110. A sealing member 1213 such as an O-ring may be installed between the inner circumferential surface of the opening end of the main housing 1110 and the sealing protrusion 1212. The sealing member 1213 may be formed to surround the sealing protrusion 1212.

The thrust support portion 1216 protrudes from one surface of the inverter housing 1210 toward the rotating shaft 1130. The thrust support portion 1216 may have a cylindrical or polygonal shape. The inverter housing 1210 has a surface facing the rotating shaft 1130, and the thrust support portion 1216 protrudes from the surface to face a bottom surface 1136 of the rotating shaft 1130.

The thrust support portion 1216 protrudes to a position in surface contact with the bottom surface 1136 of the rotating shaft 1130. The bottom surface 1136 of the rotating shaft 1130 refers to a circular surface formed at the front end of the rotating shaft 1130 exposed to the motor chamber S1 in FIG. 2.

Meanwhile, in the present invention, the term of housing may be used as a concept including all the components forming the appearance of the electric compressor 1000 such as the main housing 1110, the rear housing 1170, the inverter housing 1210, and the inverter cover 1220. Thus, the housing forms the appearance of the electric compressor 1000 and, when the housing is referred to, it may be understood as indicating at least one of the main housing 1110, the rear housing 1170, the inverter housing 1210, and the inverter cover 1220. For example, when the thrust support portion 1216 protrudes from one surface of the housing, it may mean that the thrust support portion 1216 protrudes from any one of the main housing 1110, the rear housing 1170, the inverter housing 1210, and the inverter cover 1220.

Figure 3:
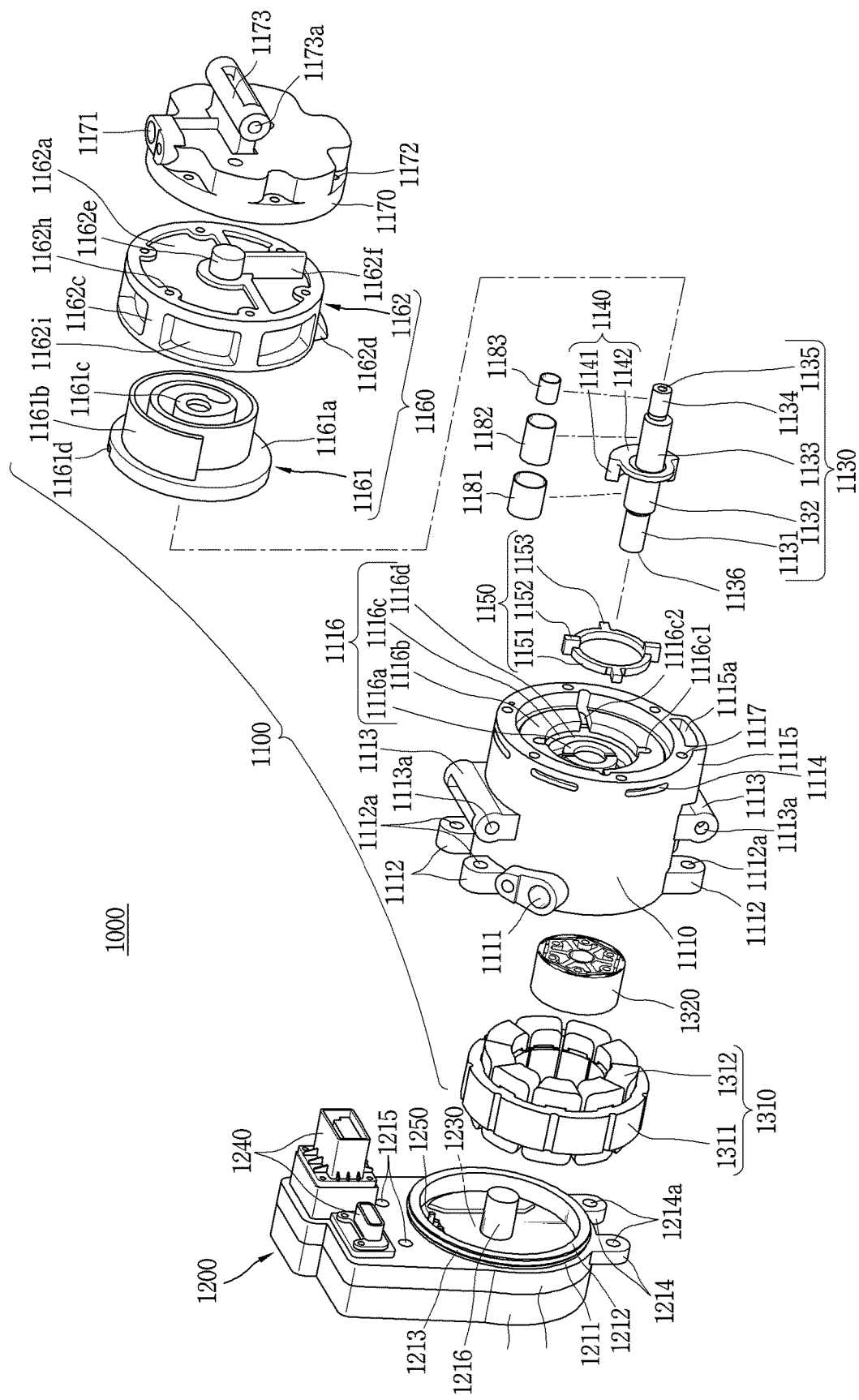
FIG. 3 is an exploded perspective view of the electric compressor shown in FIGS. 1 and 2.
Figure 4:
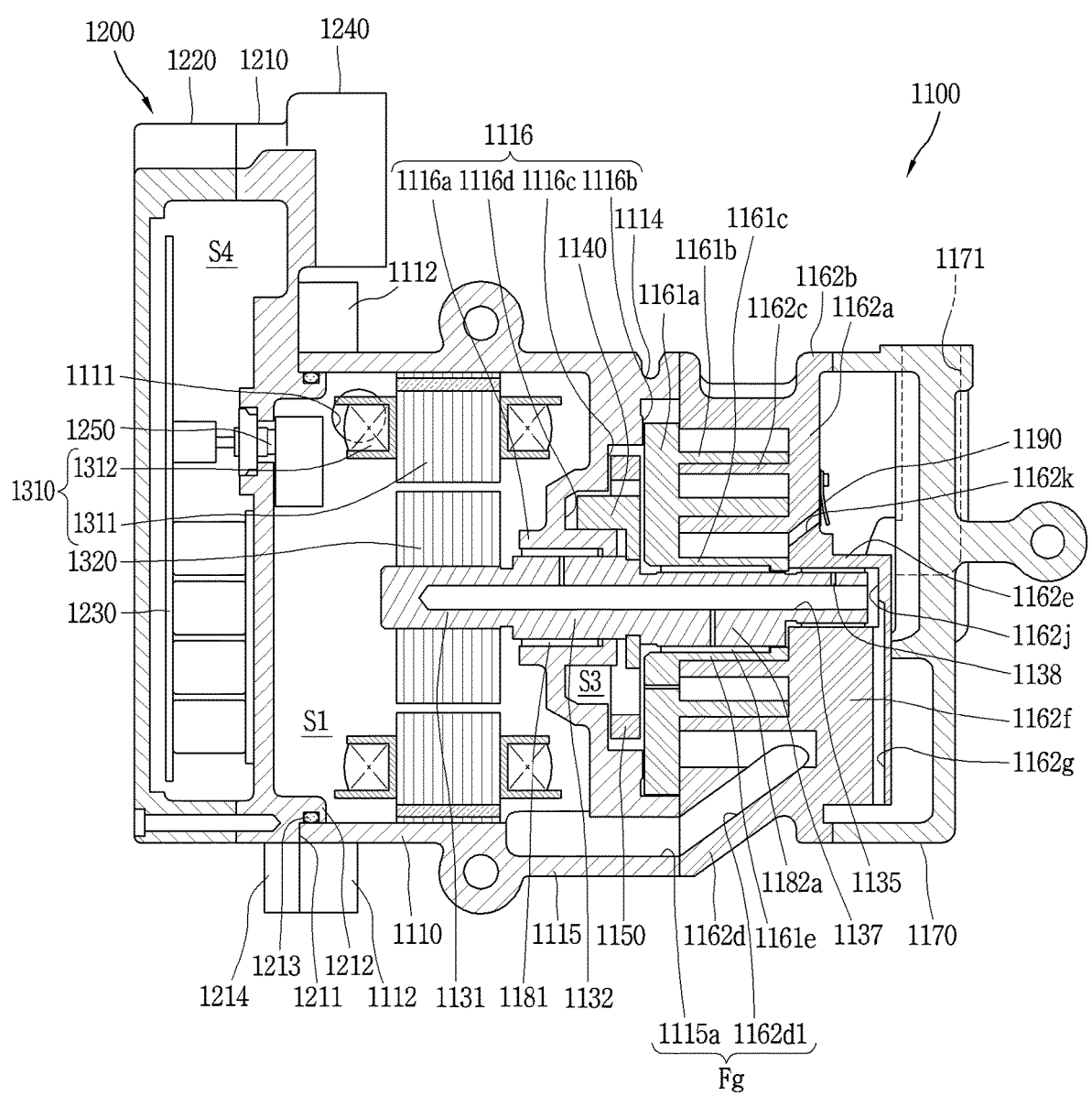
FIG. 4 is a cross-sectional view of the electric compressor shown in FIGS. 1 and 2.

FIG. 3 is an exploded perspective view of the electric compressor 1000 shown in FIGS. 1 and 2. FIG. 4 is a cross-sectional view of the electric compressor 1000 shown in FIGS. 1 and 2.

The electric compressor 1000 includes a compressor module 1100 and an inverter module 1200.

The compressor module 1100 includes a main housing 1110, a drive motor (drive unit or motor unit, 1120), a compression unit 1160, and a rear housing 1170.

First, the main housing 1110 will be described.

The front end of the main housing 1110 is an opening end. If the opening end is referred to as a first end, a frame portion 1116 is formed at a second end corresponding to the rear end. The frame portion 1116 may be formed integrally with the main housing 1110 or may be provided as a separate member. When the frame portion 1116 is integrally formed with the main housing 1110, a process of separately assembling the frame portion 1116 to the main housing 1110 may be eliminated, thereby reducing the number of assembly processes and improving assemblability of the drive motor 1120.

The frame portion 1116 forms a boundary that defines an inner space of the main housing 1110. As the frame portion 1116 is formed at the second end of the main housing 1110, the second end of the main housing 1110 forms a partially blocked structure.

The front side of the frame portion 1116 protrudes in a direction toward the drive motor 1120 (direction toward the first end). Meanwhile, the rear side of the frame portion 1116 is recessed to be stepped at least two times in the direction toward the drive motor 1120.

A first shaft receiving portion 1116a is formed at the center of the frame portion 1116. The first shaft receiving portion 1116a is formed in a hollow cylindrical shape to rotatably support the rotating shaft 1130 penetrating through the frame portion 1116. A first bearing 1181, which is formed as a bush bearing, may be inserted into the first shaft receiving portion 1116a.

The first shaft receiving portion 1116a may protrude in a direction toward the drive motor 1120. One end of the first shaft receiving portion 1116a facing the drive motor 1120 may be referred to as a front end. In addition, the first shaft receiving portion 1116a may protrude in a direction toward the first scroll 1161. The other end of the first shaft receiving portion 1116a facing the first scroll 1161 may be referred to as a rear end. The rear end of the first shaft receiving portion 1116a is formed at a position surrounded by a balance weight accommodating recess 1116d which will be described later.

On the rear side of the frame portion 1116, a scroll seating recess 1116b, an anti-rotation mechanism seating recess 1116c, and a balance weight accommodating recess 1116d are formed. The scroll seating recess 1116b, the anti-rotation mechanism seating recess 1116c, the balance weight accommodating recess 1116d, and the rear end of the first shaft receiving portion 1116a are formed to be continuously stepped to form a back pressure chamber S3.

The scroll seating recess 1116b is formed to support the first scroll 1161 in an axial direction. The first scroll 1161 includes an orbiting disk plate portion 1161a, and the scroll seating recess 1116b forms a ring-shaped support surface corresponding to the orbiting disk plate portion 1161a. The ring-shaped support surface may be partitioned into a plurality of regions by key recesses 1116c1 and 1116c2.

The anti-rotation mechanism seating recess 1116c is formed in a region enclosed by the scroll seating recess 1116b. An Oldham ring 1150 includes a ring-shaped ring portion 1151, and the anti-rotation mechanism seating recess 1116c forms a ring-shaped support surface corresponding to the ring portion 1151 of the Oldham ring 1150. The anti-rotation mechanism seating recess 1116c is formed at a position further recessed toward the drive motor 1120 than the scroll seating recess 1116b.

The anti-rotation mechanism seating recess 1116c includes a plurality of key recesses 116c1 and 1116c2 for seating the key portions 1152 and 1153 of the Oldham ring 1150. The key recesses 1116c1 and 1116c2 are formed in a radial direction of the anti-rotation mechanism seating recess 1116c. The key recesses 1116c1 and 1116c2 are formed one by one at every 90° intervals along the anti-rotation mechanism seating recess 1116c.

The balance weight accommodating recess 1116d is formed in a region surrounded by the anti-rotation mechanism seating recess 1116c. The balance weight accommodating recess 1116d has is formed to rotatably receive the balance weight 1140. The balance weight accommodating recess 1116d may be formed in a ring shape.

The first shaft receiving portion 1116a is formed in a region surrounded by the balance weight accommodating recess 1116d. The first shaft receiving portion 1116a may protrude from the center of the balance weight accommodating recess 1116d to the rear side of the main housing 1110.

A first protrusion 1115 is formed on the outer circumferential surface of the main housing 1110. A first flow path 1115a communicating with the motor chamber S1 is formed in the first protrusion 1115. The first flow path 1115a is formed to penetrate through the first protrusion 1115. The first flow path 1115a forms an suction flow path Fg allowing the compression chamber and the motor chamber S1 to communicate with each other, together with the second flow path which will be described later.

A fastening hole 1117 is formed around the second end of the main housing 1110. The fastening hole 1117 may be formed in plural. The plurality of fastening holes 1117 may be spaced apart from each other along the circumference of the second end of the main housing 1110. A fastening hole 1162h is also formed in the second scroll 1162 which will be described later. The fastening holes 1117 of the main housing 1110 and the fastening hole 1162h of the second scroll 1162 are formed at positions corresponding to each other. Accordingly, the main housing 1110 and the second scroll 1162 may be bolted to each other.

The drive motor 1120 is replaced with the contents described above with reference to FIG. 2.

Next, the rotating shaft 1130 will be described.

The rotating shaft 1130 includes a drive motor coupling portion 1131, a main bearing portion 1132, an eccentric portion 1133, a sub-bearing portion 1134, and a lubricant flow path 1135. The drive motor coupling portion 1131, the main bearing portion 1132, the eccentric portion 1133, and the sub-bearing portion 1134 are continuously formed along the axial direction of the rotating shaft 1130. The drive motor coupling portion 1131, the main bearing portion 1132, the eccentric portion 1133, and the sub-bearing portion 1134 may have a cylindrical shape and may have the same diameter or different diameters.

The drive motor coupling portion 1131 is coupled to the rotor 1122. The drive motor coupling portion 1131 may extend in the axial direction to penetrate through the center of the rotor 1122.

The main bearing portion 1132 extends in the axial direction from the drive motor coupling portion 1131. The main bearing portion 1132 may have an outer diameter larger than that of the drive motor coupling portion 1131. The center of the main bearing portion 1132 matches the center of the drive motor coupling portion 1131 in the axial direction. The main bearing portion 1132 is inserted into the first shaft receiving portion 1116a of the frame portion 1116 and penetrates through the first shaft receiving portion 1116a. The first shaft receiving portion 1116a is formed to surround the main bearing portion 1132. The circumference of the main bearing portion 1132 is rotatably supported by the first shaft receiving portion 1116a.

The eccentric portion 1133 extends in the axial direction from the main bearing portion 1132. The eccentric portion 1133 may have an outer diameter smaller than that of the main bearing portion 1132. The center of the eccentric portion 1133 does not match the center of the drive motor coupling portion 1131 and/or the center of the main bearing portion 1132 in the axial direction. Therefore, the center of the eccentric portion 1133 is formed at a position eccentric from the center of the drive motor coupling portion 1131 or the center of the main bearing portion 1132. The eccentric portion 1133 is inserted into the rotating shaft coupling portion 1161c of the first scroll 1161 and penetrates through the rotating shaft coupling portion 1161c.

The sub-bearing portion 1134 extends in the axial direction from the eccentric portion 1133. The sub-bearing portion 1134 may have an outer diameter smaller than that of the eccentric portion 1133. The center of the sub-bearing portion 1134 matches the center of the drive motor coupling portion 1131 and/or the center of the main bearing portion 1132 in the axial direction. The sub-bearing portion 1134 is inserted into a second shaft receiving portion 1162e of the second scroll 1162. The second shaft receiving portion 1162e is formed to surround the sub-bearing portion 1134. The circumference of the sub-bearing portion 1134 is rotatably supported by the second shaft receiving portion 1162e.

If there is no axial support structure of the rotating shaft 1130 and the thrust support portion 1216 to be described later, a bearing protrusion will be formed at the boundary between the main bearing portion 1132 and the eccentric portion 1133. The bearing protrusion has a ring-shaped bearing surface, and the bearing surface forms a thrust surface together with the rear end of the first shaft receiving portion 1116a to support the rotating shaft 1130 in the axial direction.

However, when the bearing protrusion protrudes from the outer circumferential surface of the rotating shaft 1130, the rotating shaft 1130 should be assembled to the electric compressor 1000 only in one direction. This is a factor that limits the degree of freedom of design and the degree of freedom of assembly of the electric compressor 1000.

The electric compressor 1000 of the present invention has an axial support structure formed by the rotating shaft 1130 and the thrust support portion 1216, and thus does not require a separate bearing protrusion. Therefore, the rotating shaft 1130 may be assembled to the first shaft receiving portion 1116a in both directions. This improves the degree of freedom of design and the degree of freedom of assembly of the electric compressor 1000.

The center of the drive motor coupling portion 1131, the center of the main bearing portion 1132, and the center of the sub-bearing portion 1134 all match in the axial direction. Therefore, the center of these may be referred to as the center of the rotating shaft 1130. In addition, a shaft portion may be used as a concept including the drive motor coupling unit 1131, the main bearing portion 1132, and the sub-bearing portion 1134. The drive motor coupling portion 1131, the main bearing portion 1132, and the sub-bearing portion 1134 may be understood to designate different portions of the shaft portion.

The lubricant flow path 1135 is formed at the shaft portion and/or the eccentric portion 1133 along the axial direction. The lubricant flow path 1135 is formed at the center of the shaft portion, and the lubricant flow path 1135 is formed at a position eccentric from the center of the eccentric portion 1133. The lubricant flow path 1135 corresponds to a supply flow path of oil stored in an oil separation chamber S2.

When the center of the shaft portion is referred to as the center of the rotating shaft 1130, the center of the eccentric portion 1133 exists at a position eccentric from the center of the rotating shaft 1130. Accordingly, the first scroll 1161 may be understood to be eccentrically coupled to the rotating shaft 1130, and the eccentric portion 1133 may transmit a rotational force of the drive motor 1120 to the first scroll 1161. The first scroll 1161 receiving the rotational force through the eccentric portion 1133 performs an orbiting motion by the Oldham ring 1150.

Next, the balance weight 1140 will be described.

The balance weight 1140 is coupled to the rotating shaft 1130. The balance weight 1140 is provided to offset an eccentric load (or the amount of eccentricity) of the rotating shaft 1130. The balance weight 1140 includes a ring portion 1141 and an eccentric mass portion 1142.

The ring portion 1141 is formed in the shape of a ring surrounding the rotating shaft 1130 so as to be coupled to the rotating shaft 1130. An outer diameter of the ring portion 1141 is larger than an outer diameter of the rotating shaft 1130.

The eccentric mass portion 1142 extends along the axial direction or a direction parallel to the axial direction from the edge of the ring portion 1141. The eccentric mass portion 1142 protrudes from an arc having a certain center angle of 360° of the edge of the ring portion 1141 in the axial direction or in a direction parallel to the axial direction. Accordingly, the eccentric mass portion 1142 partially wraps the rotating shaft 1130 at a position spaced apart from the rotating shaft 1130.

Next, the Oldham ring 1150 will be described.

The Oldham ring 1150 is an anti-rotation mechanism that prevents rotation of the first scroll 1161. However, as the anti-rotation mechanism, not only Oldham ring 1150 but also a mechanism including a pin and a ring may be applied. The Oldham ring 1150 is disposed between the frame portion 1116 of the main housing 1110 and the first scroll 1161. The Oldham ring 1150 is seated in the anti-rotation mechanism seating recess 1116c of the frame portion 1116. The Oldham ring 1150 is supported by the frame portion 1116 in the axial direction.

The Oldham ring 1150 includes a ring portion 1151 and key portions 1152 and 1153.

The ring portion 1151 is formed in a ring or a shape corresponding to the ring. The ring portion 1151 is formed to have a size corresponding to the anti-rotation mechanism seating recess 1116c. The ring portion 1151 is seated in the anti-rotation mechanism seating recess 1116c.

The key portions 1152 and 1153 protrude from the ring portion 1151. The key portions 1152 and 1153 include a pair of first keys 1152 and a pair of second keys 1153.

The pair of first keys 1152 are formed at positions having an angle of 180° to each other in the ring portion 1151. The pair of second keys 1153 are also formed at positions having an angle of 180° to each other in the ring portion 1151. The first key 1152 and the second key 1153 are alternately formed along the ring portion 1151. The first key 1152 and the second key 1153 are formed at positions having an angle of 90° to each other.

The first key 1152 protrudes in the radial direction of the ring portion 1151 and toward the first scroll 1161. The first key 1152 is inserted into a first scroll side key recess 1161d. In addition, the first key 1152 may be inserted into a frame portion side key recess 1116c1.

The second key 1153 protrudes in the radial direction of the ring portion 1151. The second key 1153 may protrude toward the frame portion 1116. The second key 1153 is inserted into a frame portion side key recess 1116c2.

Next, the compression unit 1160 will be described.

The compression unit 1160 is formed to compress a fluid to be compressed such as a refrigerant. The compression unit 1160 includes a first scroll 1161 and a second scroll 1162. The compression unit 1160 is formed by the first scroll 1161 and the second scroll 1162.

The first scroll 1161 is provided on one side of the drive motor 1120. The first scroll 1161 is seated in the scroll seating recess 1116b of the frame portion 1116. The first scroll 1161 is supported in the axial direction by the frame portion 1116.

The first scroll 1161 is coupled to the eccentric portion 1133 of the rotating shaft 1130. Therefore, the first scroll 1161 is eccentrically coupled to the rotating shaft 1130. The first scroll 1161 receiving the rotational force through the eccentric portion 1133 performs an orbiting motion by the Oldham ring 1150. The first scroll 1161 may be referred to as an orbiting scroll in that it performs an orbiting motion.

The second scroll 1162 is fixed at a position facing the first scroll 1161. The second scroll 1162 is coupled to the second end (rear end) of the main housing 1110. The second scroll 1162 may be referred to as a fixed scroll or non-orbiting scroll in that it is fixed. The second scroll 1162 is disposed between the first scroll 1161 and the rear housing 1170.

The first scroll 1161 and the second scroll 1162 are coupled with each other to form a pair of compression chambers V. As the first scroll 1161 performs an orbiting motion, a volume of the compression chamber V may be repeatedly changed, and thus, the fluid may be compressed in the compression chamber V.

The first scroll 1161 includes an orbiting disk plate portion 1161a, an orbiting wrap 1161b, and a rotating shaft coupling portion 1161c.

The orbiting disk plate portion 1161a is formed in a plate shape corresponding to an inner circumferential surface of the main housing 1110. If the inner circumferential surface of the main housing 1110 has a cross-section corresponding to a circle, the orbiting disk plate portion 1161a has a disc shape.

When one of both surfaces of the orbiting disk plate portion 1161a which faces the second scroll 1162 is a first surface, the orbiting wrap 1161b protrudes from the first surface. When the other surface of the orbiting disk plate portion 1161a which faces the frame portion 1116 is a second surface, a first scroll side key recess 1161d is formed on the second surface. The first scroll side key recess 1161d is formed to receive the first key 1152 of the Oldham ring 1150, and the first scroll side key recess 1161d extends along the radial direction of the orbiting disk plate portion 1161a.

The orbiting wrap 1161b protrudes in an involute curve shape from the first surface of the orbiting disk plate portion 1161a toward the second scroll 1162. An involute curve refers to a curve that corresponds to a trace drawn by the end of yarn when the yarn wound around a base circle of a certain radius is unwound. The orbiting wrap 1161b is engaged with a fixed wrap 1162b to be described later to form a compression chamber V on each of the inner and outer surfaces of the fixed wrap 1162b.

The rotating shaft coupling portion 1161c is formed at the center of the orbiting disk plate portion 1161a. The rotating shaft coupling portion 1161c is formed in a hollow cylindrical shape to accommodate the eccentric portion 1133 of the rotating shaft 1130. The rotating shaft coupling portion 1161c may protrude toward the second scroll 1162 from the first surface of the orbiting disk plate portion 1161a. The rotating shaft coupling portion 1161c is formed at a position corresponding to the base circle in the involute shape. Accordingly, the circumference of the rotating shaft coupling portion 1161c may form a base circle of the involute curve described in the orbiting wrap 1161b. Therefore, the rotating shaft coupling portion 1161c forms the innermost part of the orbiting wrap 1161b.

The eccentric portion 1133 penetrates through the rotating shaft coupling portion 1161c in the axial direction. A second bearing 1182 is inserted into the rotating shaft coupling portion 1161c. The second bearing 1182 is disposed between the eccentric portion 1133 and the rotating shaft coupling portion 1161c. The second bearing 1182 forms a bearing surface with an eccentric portion 1133 inserted into the rotating shaft coupling portion 1161c. The second bearing 1182 may be formed in a hollow cylindrical shape to surround the eccentric portion 1133. In the radial direction of the first scroll 1161, the rotating shaft coupling portion 1161c and/or the second bearing 1182 are arranged to overlap the orbiting wrap 1161b.

The second scroll 1162 includes a fixed disk plate portion 1162a, a fixed wrap 1162b, a side wall portion 1162c, a second protrusion 1162d, a second shaft receiving portion 1162e, an oil guide protrusion 1162f, an oil guide flow path 1162g, a fastening hole 1162h, a weight loss recess 1162i, an oil guide region 1162j, and a discharge flow path 1162k.

The fixed disk plate portion 1162a is formed in a plate shape corresponding to the second end of the main housing 1110. If the circumference of the second end has a cross-section corresponding to a circle, the fixed disk plate portion 1162a has a disk shape.

When one of both surfaces of the fixed disk plate portion 1162a which faces the first scroll 1161 is a first surface, the fixed wrap 1162b is formed on the first surface. However, the fixed wrap 1162b is not visually checked in FIG. 3, but may be checked in FIG. 4. When the other surface of the fixed disk plate portion 1162a which faces the rear housing 1170 is a second surface, the second surface has a second shaft receiving portion 1162e, an oil guide protrusion 1162f, and a fastening hole 1162h, and the like.

The fixed wrap 1162b may be formed in an involute shape like the orbiting wrap 1161b. The fixed wrap 1162b may be formed in various other shapes. As described above, the fixed wrap 1162b is engaged with the orbiting wrap 1161b to form the compression chamber V. The orbiting wrap 1161b is inserted between the fixed wraps 1162b, and the fixed wrap 1162b is inserted between the orbiting wraps 1161b.

The side wall portion 1162c protrudes toward the second end of the main housing 1110 along the edge of the fixed disk plate portion 1162a. The side wall portion 1162c is formed to surround the fixed wrap 1162b in the radial direction of the second scroll 1162.

The second protrusion 1162d protrudes from the side wall portion 1162c. The second protrusion 1162d is formed to correspond to the first protrusion 1115 of the main housing 1110 described above. A second flow path 1162d1 is formed in the second protrusion 1162d. The second flow path 1162d1 may be formed parallel to the axial direction or may be formed to be inclined with respect to the axial direction. The second flow path 1162d1 forms the suction flow path Fg together with the first flow path 1115a formed in the first protrusion 1115.

When the second flow path 1162d1 is formed in the axial direction, an outer diameter of the fixed disk plate portion 1162a may be enlarged. Accordingly, a wound length of the fixed wrap 1162b may be increased compared to the same outer diameter of the main housing 1110. When the second flow path 1162d1 is formed to be inclined, the wound length of the fixed wrap 1162b may be reduced compared to the same capacity of the compression chamber V, thereby miniaturizing the electric compressor 1000.

The second shaft receiving portion 1162e is formed at the center of the fixed disk plate portion 1162a. The second shaft receiving portion 1162e is formed to accommodate the sub-bearing portion 1134 of the rotating shaft 1130. The second shaft receiving portion 1162e may be formed to be recessed in the axial direction from the fixed disk plate portion 1162a toward the rear housing 1170. When the surface accommodating the rotating shaft 1130 is an inner surface and the surface facing the rear housing 1170 is an outer surface, the second shaft receiving portion 1162e is recessed from the inner surface and protrudes from the outer surface.

The second shaft receiving portion 1162e may be formed by increasing the thickness of the fixed disk plate portion 1162a than that shown in FIG. 3, but in this case, a weight of the second scroll 1162 is not only increased but also an unnecessary part may be formed to be thick, thereby increasing a dead volume. The dead volume refers to a volume that is structurally and functionally wasted uselessly.

The second scroll 1162 is disposed to face one end of the rotating shaft 1130. The second shaft receiving portion 1162e is formed to surround the outer circumferential surface and the end of the sub-bearing portion 1134. The sub-bearing portion 1134 of the rotating shaft 1130 is inserted into the second shaft receiving portion 1162e. The sub-bearing portion 1134 is supported in the radial direction by the second shaft receiving portion 1162e.

The second shaft receiving portion 1162e is formed in a cylindrical shape in which one bottom surface is blocked. A third bearing 1183 is inserted into the second shaft receiving portion 1162e. The third bearing 1183 may be formed in a hollow cylindrical shape to surround the sub-bearing portion 1134 of the rotating shaft 1130. The third bearing 1183 is disposed between the second shaft receiving portion 1162e and the sub-bearing portion 1134. The third bearing 1183 forms a bearing surface with the sub-bearing portion 1134. The third bearing 1183 may be formed as a bush bearing or a needle bearing. In the radial direction of the second scroll 1162, the second shaft receiving portion 1162e is disposed to overlap the sub-bearing portion 1134 and/or the third bearing 1183.

The oil guide protrusion 1162f is formed below the second shaft receiving portion 1162e. The oil guide protrusion 1162f protrudes downward from the second shaft receiving portion 1162e or protrudes from the fixed disk plate portion 1162a toward the rear housing 1170. An oil guide flow path 1162g may be formed in the oil guide protrusion 1162f.

The oil guide flow path 1162g penetrates through the second scroll 1162 to supply the oil stored in the oil separation chamber S2 to the bearing surface of the rotating shaft 1130. For example, the oil guide flow path 1162g may be formed to penetrate through the oil guide protrusion 1162f and the fixed disk plate portion 1162a. The bearing surface of the rotating shaft 1130 refers to the outer circumferential surface of the main bearing portion 1132, the outer circumferential surface of the eccentric portion 1133, and the outer circumferential surface of the sub-bearing portion 1134. A part of the oil flows into the back pressure chamber S3 to form a back pressure supporting the first scroll 1161 toward the second scroll 1162.

The fastening hole 1162h is formed at a position corresponding to the fastening hole 1117 of the main housing 1110 and the fastening hole 1172 of the rear housing 1170. The fastening hole 1162h may be formed along the circumference of the fixed disk plate portion 1162a. The fastening hole 1162h may be formed to penetrate through the fixed disk plate portion 1162a and the side wall portion 1162c. The fastening hole 1162h may be formed at a position where the weight loss recess 1162i is not formed, or may be formed at a position penetrating between two weight loss recesses 1162i. Description of the weight loss recess 1162i formed at the side wall portion 1162c is replaced by the weight loss recess described above.

The oil guide region 1162j is formed at a region wrapped by the second shaft receiving portion 1162e. The oil guide region 1162j is located between the oil guide flow path 1162h and the lubricant flow path 1135. The oil guide flow path 1162h may communicate with the oil separation chamber S2, and the lubricant flow path 1135 may communicate with each bearing surface provided on the outer circumferential surface of the rotating shaft 1130.

The discharge flow path 1162k corresponds to a flow path for discharging the fluid compressed in the compression chamber V to the oil separation chamber S2. The discharge flow path 1162k may be formed to penetrate through the fixed disk plate portion 1162a. In order to open and close the discharge flow path, a discharge valve 1190 that is opened at a preset pressure or higher may be installed.

Next, the rear housing 1170 will be described.

If the drive motor 1120 is formed on one side of the compression unit 1160, the rear housing 1170 is formed on the other side of the compression unit 1160. For example, the rear housing 1170 is formed on the opposite side of the drive motor 1120 with respect to the compression unit 1160.

The rear housing 1170 has an opened first end and a closed second end. If the drive motor 1120 side is a front side, a first end corresponds to a front end and a second end corresponds to a rear end. When a bolt is inserted through the fastening hole 1172 formed in the rear housing 1170, the bolt is coupled to the fastening hole 1117 of the main housing 1110 by sequentially passing through the fastening hole 1172 of the rear housing 1170 and the fastening hole 1162h of the second scroll 1162. Accordingly, the main housing 1110, the second scroll 1162, and the rear housing 1170 may be bolted to each other.

The rear end of the rear housing 1170 is spaced apart from the second scroll 1162. Accordingly, the oil separation chamber S2 is formed between the rear housing 1170 and the second scroll 1162. The oil separation chamber S2 corresponds to a space accommodating the fluid discharged after being compressed by the compression unit 1160 and corresponds to a space accommodating oil to be supplied to the bearing surface of the rotating shaft 1130. A sealing member (not shown) such as a gasket may be installed between the rear housing 1170 and the second scroll 1162 to seal the oil separation chamber S2.

The rear housing 1170 has a support protrusion 1174 that protrudes toward the second scroll 1162. The support protrusion 1174 protrudes from an inner surface of the second end. Here, the inner surface refers to a surface opposite to the outer surface from which the fixing portion 1173 protrudes. The support protrusion 1174 may protrude to a position in contact with the oil guide protrusion 1162f of the second scroll 1162. The support protrusion 1174 supports the second scroll 1162 toward the first scroll 1161 along the axial direction.

Next, the inverter module 1200 will be described.

The inverter housing 1210 is coupled to the opposite side of the rear housing 1170 among both ends of the main housing 1110, that is, to the front end forming the opening end of the main housing 1110. The inverter housing 1210 is coupled to the inverter cover 1220 to form an inverter chamber S4 therebetween. The inverter housing 1210 and the inverter cover 1220 may be bolted.

The inverter component 1230 is mounted in the inverter chamber S4. The electrical connection portion 1250 is electrically connected to inverter component 1230. The electrical connection portion 1250 is exposed toward the motor chamber S1. Next, an axial support structure of the rotating shaft 1130 proposed in the present invention will be described.

As described above, the drive motor 1300 will be described in detail.

The drive motor 1300 includes a stator 1310 and a rotor 1320.

The stator 1310 includes a stator core 1311 and a coil 1312 wound around the stator core 1311. The stator core 1311 formed by staking a plurality of annular disks. The stator core 1311 includes a yoke having an annular shape and a tooth protruding inward from an inner circumferential surface of the yoke.

The teeth are formed in plural along the inner circumferential surface and spaced apart from each other at preset intervals. An outer circumferential surface of the yoke may be hot-pressed (shrinkage-fit) into the inner circumferential surface of the main housing 1110 so as to be coupled to the main housing 1110. A coil 1312 may be wound around each tooth to form a coil winding part. When a current is applied to the coil 1312 by the inverter module 1200, a magnetic field is formed in the stator 1310 to generate a rotational force for rotating the rotor 1320 by an interaction with the rotor 1320.

Meanwhile, the stator 1310 forms an accommodating space extending along the axial direction to accommodate the rotor 1320 therein. The rotor 1320 has a substantially cylindrical shape and may rotate by interacting with the stator 1310 as described above. The rotor 1320 is disposed to have a preset air gap with the inner circumferential surface of the stator, that is, the inner circumferential surface of the tooth, so as to be rotatably received in the accommodating space.

As described above, the rotating shaft 1130 is inserted into and coupled to the center portion of the rotor 1320. The rotor 1320, which rotates by interaction with the stator 1310, rotates together with the rotating shaft 1130, and the rotating shaft 1130 transmits a rotational force to the orbiting scroll 1162. Here, since the rotating shaft 1130 is eccentrically coupled to the orbiting scroll 1162, the orbiting scroll 1162 is pivoted.

The air gap between the stator 1310 and the rotor 1320 may serve as a flow path guiding the refrigerant located on the front side of the drive motor 1300 after flowing into the intake port 1111, together with a refrigerant guide recess 136 to be described later.

Hereinafter, a structure of the rotor 1320 will be described in detail with reference to the accompanying drawings.

Figure 5:
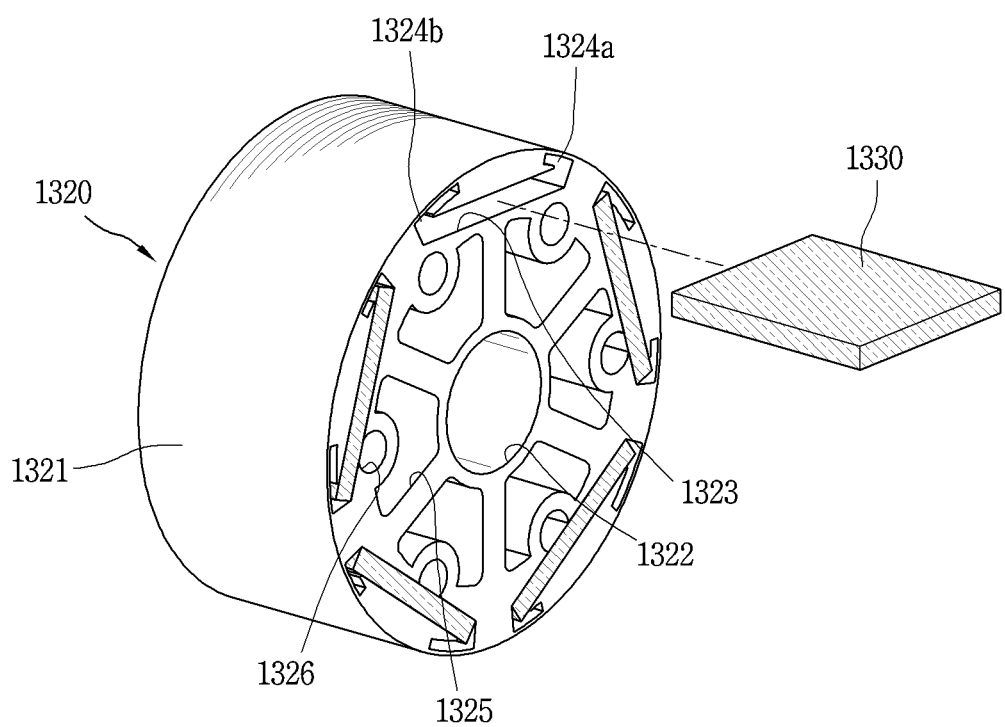
FIG. 5 is a perspective view of a rotor according to an embodiment of the present invention.
Figure 6A:
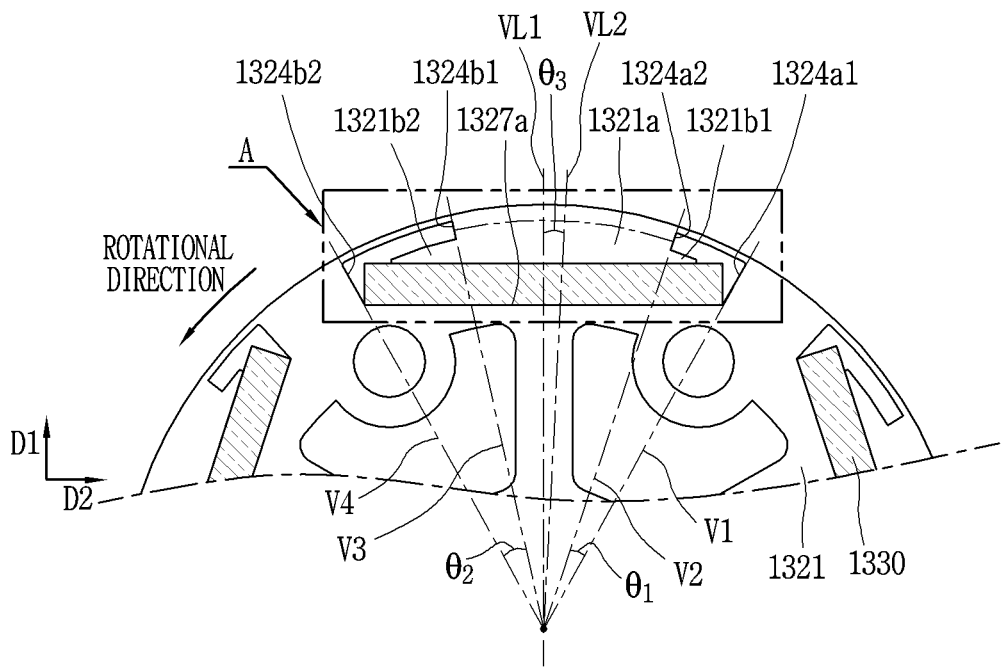
FIG. 6A is a front view of the rotor shown in FIG. 5.
Figure 6B:
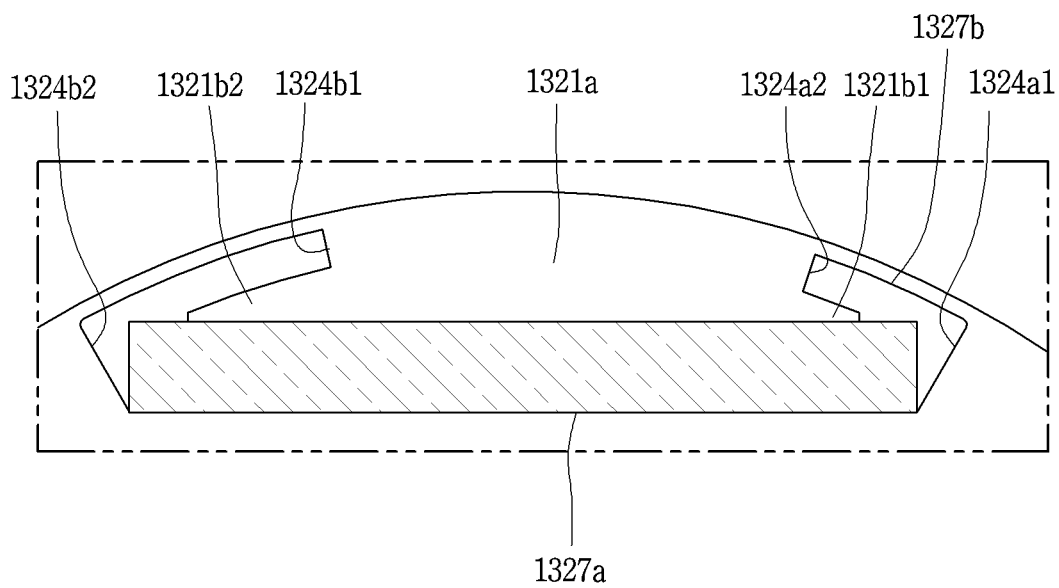
FIG. 6B is an enlarged view of A shown in FIG. 6A.

FIG. 5 is a perspective view showing a rotor according to an embodiment of the present invention, FIG. 6A is a front view of the rotor shown in FIG. 5, and FIG. 6B is an enlarged view of A shown in FIG. 6A.

The rotor 1320 according to the present invention may include a rotor core 1321 formed by stacking a plurality of iron plates formed in a circular shape as a whole in one direction and a magnetic member 1330 (hereinafter, referred to as a magnetic member) such as a permanent magnet inserted into the rotor core 1321.

The rotor core 1321 includes a rotating shaft accommodating recess 1322 into which the rotating shaft 1130 is inserted and coupled, a magnetic member accommodating recess 1323 into which the magnetic member 1330 is inserted, and flux barriers 3324 formed on both sides of the magnetic member.

The rotating shaft accommodating recess 1322 is formed at the central portion of the rotor 1320. The rotating shaft accommodating recess 1322 may be formed to penetrate through one end and the other end of the rotor 1320 in the axial direction to accommodate the rotating shaft 1130. The rotating shaft accommodating recess 1322 may be formed in a cylindrical space having a circular cross-section so as to correspond to the shape of the cylindrical rotating shaft 1130.

However, the present invention is not limited thereto, and the rotating shaft accommodating recess 1322 and the drive motor coupling portion 1131 may be formed in a cross-section of a specific shape to prevent relative rotation between the rotor 1320 and the rotating shaft 1130. For example, the cross-section of the rotating shaft accommodating recess 1322 and the drive motor coupling portion 1131 may be formed to have an ellipse shape.

Meanwhile, the magnetic member 1330 is inserted into the magnetic member accommodating recess 1323. The magnetic member 1330 may be formed to have a length corresponding to an axial length of the rotor 1320. Accordingly, the magnetic member accommodating recess 1323 may be formed to penetrate through one end and the other end of the rotor 1320 to accommodate the magnetic member 1330.

The magnetic member accommodating recess 1323 may be formed to be biased to the outer circumferential surface of the rotor 1320. The magnetic member accommodating recess 1323 may be formed to extend in a chord direction of the cross-section of the rotor 1320 formed in a circular shape. Here, the chord direction refers to a straight line connecting two points on the circumference of a circle and may mean a direction in which the line extends.

In other words, the magnetic member accommodating recess 1323 may be formed to extend in a second direction D2 perpendicular to a first direction D1 parallel to the radial direction at the center of the magnetic member accommodating recess 1323.

The magnetic member accommodating recess 1323 may be provided in plural along the circumferential direction of the rotor 1320. For example, the number of the magnetic member accommodating recess 1323 may be 4, 5, 6, or greater, and the magnetic member accommodating recess 1323 may be arranged in a polygonal shape inscribed in an outer circumference of the rotor 1320 formed in a circular shape by the magnetic member accommodating recess 1323 extending in one direction.

The flux barriers 1324 are formed on both sides of the magnetic member accommodating recess 1323 to reduce torque ripple increased due to a magnetic flux concentrated by the magnetic member 1330.

The flux barriers 1324 may be formed to penetrate through one end and the other end of the rotor 1320 to correspond to the magnetic member inserted to penetrate through one end and the other end of the rotor 1320. The flux barriers 1324 include a first flux barrier 1324a and a second flux barrier 1324b formed at one side and the other side of the magnetic member accommodating recess 1323.

The first flux barrier 1324a and the second flux barrier 1324b extend in the circumferential direction so as to be close to each other at positions adjacent to one end and the other end of the magnetic member accommodating recess 1323, respectively. In this case, the first flux barrier 1324a and the second flux barrier 1324b may extend to be parallel to and along the outer circumference of the rotor 1320. In addition, a radial width of the first flux barrier 1324a and the second flux barrier 1324b may extend uniformly.

Accordingly, an interval between the first and second flux barriers 1324a and 1325b and the outer circumferential surface of the rotor 1320 may be kept constant.

Due to the structure of the flux barrier 1324, a magnetic flux density generated by the magnetic member 1330 may be concentrated on the center of the magnetic member 1330, not on the end of the magnetic member 1330. Accordingly, a high frequency component due to magnet flux may be reduced, and thus, core loss occurring in the drive motor 1300 may be reduced.

Meanwhile, the first flux barrier 1324a and the second flux barrier 1324b are sequentially formed along a rotation direction. As shown in FIG. 6A, when the rotor 1320 rotates in a counterclockwise direction, the first flux barrier 1324a is formed on the right side of the second flux barrier 1324b. In other words, the first flux barrier 1324a is formed on the right side of the magnetic member 1330 and extends along the rotation direction of the rotor 1320 in the drawing and the second flux barrier 1324b extends in a direction opposite to the rotation direction of the rotor 1320.

The flux barrier 1324 is formed in plural along the circumferential direction to correspond to the number of the magnetic member accommodating recesses 1323.

When the drive motor 1300 is driven, lines of magnetic force generated by the stator 1310 and the rotor 1320 flow through the rotor. At this time, the rotor 1320 is rotated in one direction and the lines of magnetic force are biased in the direction opposite to the rotation direction. Accordingly, a magnetic flux density on the side of the first flux barrier 1324a becomes higher than the magnetic flux density on the side of the second flux barrier 1324b. This increases the torque ripple and decreases the efficiency of the drive motor.

According to the present invention, the first flux barrier 1324a and the second flux barrier 1324b respectively formed on both end portions of the magnetic member 1330 may be formed in an asymmetric shape. As described above, the first flux barrier 1324a and the second flux barrier 1324b extend along the circumferential direction so as to be close to each other at positions adjacent to one end and the other end of the magnetic member accommodating recess 1323, respectively. Here, the lengths of the first flux barrier 1324a and the second flux barrier 1324b extending in the circumferential direction may be different from each other.

According to an embodiment of the present invention, the length of the first flux barrier 1324a extending in the circumferential direction may be shorter than the length of the second flux barrier 1324b extending in the circumferential direction. In other words, the second flux barrier 1324b may extend longer in the circumferential direction than the first flux barrier 1324a.

In more detail, the first flux barrier 1324a extends in the circumferential direction and includes one surface 1324a1 and the other surface 1324a2 formed to face each other in the circumferential direction. In addition, each of the second flux barriers 1324b includes one surface 1324b1 and the other surface 1324b2 formed to face each other.

The circumferential length between one surface 1324a1 and the other surface 1324a2 of the first flux barrier 1324a may be shorter than the circumferential length between one surface 1324b1 and the other surface 1324b2 of the second flux barrier 1324b.

Referring to FIGS. 5 and 6A, in the present embodiment, the second flux barrier 1324b may extend longer in the circumferential direction than the first flux barrier 1324a. When an imaginary line extending from the center O of the rotor core 1321 to one surface 1324a1 of the first flux barrier 1324a is a first line V1 and an imaginary line extending from the center O of the rotor core 1321 to the other surface 1324a2 of the first flux barrier 1324a is a second line V2, an angle formed between the first line V1 and the second line V2 may be set to a first angle θ1.

In addition, an imaginary line extending from the center O of the rotor core 1321 to one surface 1324b1 of the second flux barrier 1324b is a third line V3 and an imaginary line extending from the center O of the rotor core 1321 to the other surface 1324b2 of the second flux barrier 1324b is a fourth line V4, angle formed between the third line V3 and the fourth line V4 may be set to a second angle θ2.

Here, the second angle θ2 may be larger than the first angle θ1. Preferably, the first angle θ1 may be formed as 8 degrees to 12 degrees, and the second angle θ2 may be formed as 13 degrees to 17 degrees.

In other words, the angle between one surface 1324a1 and the other surface 1324a2 of the first flux barrier 1324a with respect to the center O of the rotor core 1321 may be 8 to 12 degrees, and the angle between one surface 1324b1 and the other surface 1324b2 of the second flux barrier 1324b with respect to the center O of the rotor core 1321 may be 13 degrees to 17 degrees.

Meanwhile, if it is described again from the perspective of the rotor core 1321, the rotor 1320 may have a through hole 1327 formed along the axial direction of the rotating shaft 1130. Referring to FIG. 6B, the through hole 1327 may be divided into the magnetic member accommodating recess 1323 region into which the magnetic member 1330 is inserted and the flux barrier 1324 region extending from both sides of the magnetic member 1330 to reduce torque ripple.

More specifically, the through hole 1327 may include an inner side surface 1327a adjacent to the rotating shaft coupling recess 1322 and an outer side surface 1327b adjacent to the outer circumferential surface of the rotor core. Here, the inner side surface 1327a may be formed in a shape extending in one direction to contact one surface of the magnetic member 1330. Here, the one direction D2 may refer to a chord direction of a circle connecting two points of the circumference in a straight line. In other words, one direction may refer to a direction perpendicular to the first direction parallel to the radial direction at the center of the magnetic member 1330.

The outer side surface 1327b may extend in parallel to the outer circumferential surface of the rotor core 1321. That is, the outer side surface 1327b may be formed as a curved surface. Meanwhile, both side surfaces connecting the inner side surface 1327a and the outer side surface 1327b may extend in the radial direction.

In the structure of the through hole 1327, the magnetic member support portion 1321a may protrude from the outer side surface 1327b toward the center of the rotor core 1321 so as to be in contact with and support the other surface of the magnetic member 1330. The magnetic member support portion 1321a may be formed to have a width extending along the one direction D2 or the circumferential direction.

The magnetic member support portion 1321a may further include first and second support protrusions 1321b1 and 1321b2 that protrude from both sides to increase a contact area with the magnetic member 1330. Here, the first support protrusion 1321b1 and the second support protrusion 1321b2 may form at least a portion of the first flux barrier 1324a and the second flux barrier 1324b, respectively.

That is, the outer side surface 1327b and the first support protrusion 1321b1 are spaced apart from each other at a preset interval and a space between the outer side surface 1327b and the first support protrusion 1321b1 may be referred to as a part of the first flux barrier 1324*a*. In addition, the outer side surface 1327*b* and the second support protrusion 1321*b*2 are spaced apart from each other at a preset interval and a space between the outer side surface 1327*b* and the first support protrusion 1321*b*2 may be referred to as a part of the second flux barrier 1324*b*.

According to the present invention, the magnetic member support portion 1321*a* may be formed to be biased along the circumferential direction at the outer side surface 1327*b*. The center of the magnetic member support portion 1321*a* in the circumferential direction may be formed so as not to match the center of the magnetic member 1330 in the radial direction.

Referring back to FIG. 6B, the magnetic member support portion 1321*a* may be formed to be biased in a direction opposite to the rotation direction. In the drawings, the magnetic member support portion 1321*a* is formed to be biased to the right side. Accordingly, the first support protrusion 1321*b*1 formed on the right side (the opposite direction of the rotation direction) of the magnetic member support portion 1321*a* may be shorter than the second support protrusion 1321*b*2 formed on the opposite side.

The center of the magnetic member support portion 1321*a* in the circumferential direction may be formed so as not to match the center of the magnetic member 1330 in the radial direction. That is, the center of the magnetic member support portion 1321*a* in the circumferential direction may be located behind the center of the magnetic member 1330 with respect to the rotation direction.

In other words, with respect to the imaginary line VL1 connecting from the center of the magnetic member to the center O of the rotor core 1321, the imaginary line VL2 connecting from the center in the circumferential direction between the other surface 1324*a*2 of the first flux barrier 1324*a* and one surface 1324*b*1 of the second flux barrier to the center O of the rotor core 1321 may form a preset angle θ3 in a direction opposite to the rotation direction. Here, the preset angle θ3 may be 0.5 degrees to 3 degrees.

According to such a structure, an area of the first support protrusion 1321*b* on which a magnet flux density may be concentrated according to rotation of the drive motor 1300 in one direction may be reduced. As a result, copper loss may be reduced due to improvement of the characteristics of the drive motor 1300 based on the B-H curve, and thus, efficiency of the drive motor 1300 may be increased.

Figure 7A:
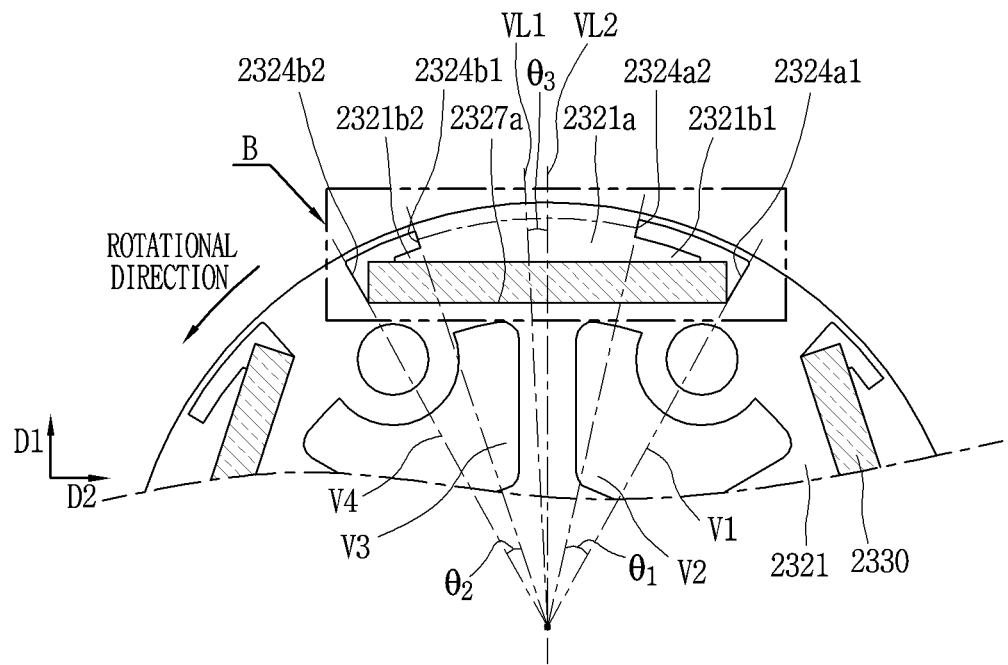
FIG. 7A is a front view of a rotor according to another embodiment of the present invention.
Figure 7B:
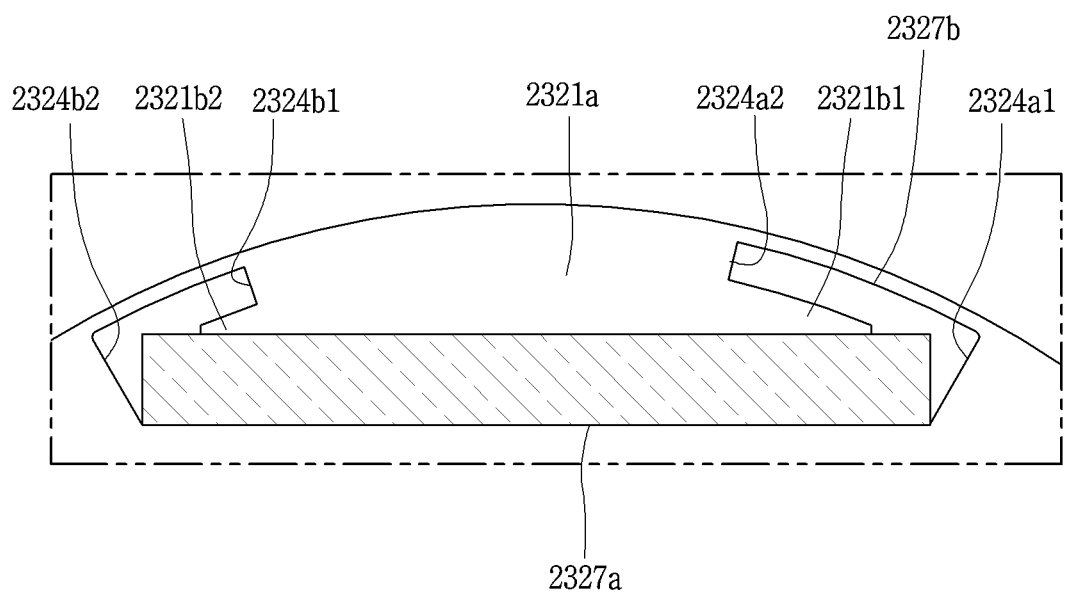
FIG. 7B is an enlarged view of B shown in FIG. 7A.

FIG. 7A is a front view of a rotor according to another embodiment of the present invention, and FIG. 7B is an enlarged view of B shown in FIG. 7A.

In the present embodiment, unlike the above-described embodiment, a first flux barrier 2324*a* may extend longer in the circumferential direction than the second flux barrier 2324*b*.

That is, a circumferential length between one surface 2324*a*1 and the other surface 2324*a*2 of the first flux barrier 2324*a* may be longer than a circumferential length between one surface 2324*b*1 and the other surface 2324*b*2 of the second flux barrier 2324*b*.

Similar to the embodiment described above, when an imaginary line extending from the center O of the rotor core 2321 to one surface 2324*a*1 of the first flux barrier 2324*a* is a first line V1 and an imaginary line extending from the center O of the rotor core 2321 to the other surface 2324*a*2 of the first flux barrier 2324*a* is a second line V2, an angle formed between the first line V1 and the second line V2 may be set to a first angle θ1.

According to another embodiment of the present invention, the first angle θ1 may be greater than the second angle θ2. Preferably, the first angle θ1 may be formed as 13 degrees to 17 degrees and the second angle θ2 may be formed as 8 degrees to 12 degrees.

In other words, the angle between one surface 2324*a*1 and the other surface 2324*a*2 of the first flux barrier 2324*a* with respect to the center O of the rotor core 1321 may be 13 degrees to 17 degrees and the angle between one surface 2324*b*1 and the other surface 2324*b*2 of the second flux barrier with respect to the center O of the rotor core 2321 may be 8 degrees to 12 degrees.

In addition, referring to FIG. 7B, the magnetic member support portion 2321*a* is formed to be biased to the left side. That is, the first support protrusion 2321*b*1 formed on the right side (the direction opposite to the rotation direction) with respect to the magnetic member support portion 2321*a* may be longer than the second support protrusion 2321*b*2 formed on the opposite side.

Here, the center of the circumferential direction of the magnetic member support portion 1321*a* may be located in front of the center of the magnetic member 1330 with respect to the rotation direction.

In other words, with respect to the imaginary line VL1 connecting from the center of the magnetic member to the center O of the rotor core 1321, the imaginary line VL2 connecting from the center in the circumferential direction between the other surface 1324*a*2 of the first flux barrier 1324*a* and one surface 1324*b*1 of the second flux barrier to the center O of the rotor core 1321 may form a preset angle θ3 in a direction opposite to the rotation direction. Here, the preset angle θ3 may be 0.5 degrees to 3 degrees.

According to another embodiment of the present invention as described above, since the area of the first support protrusion 2321*b*1 increases, an area in which a magnetic path may be formed may increase. As a result, the phenomenon in which the magnetic flux density is concentrated may be alleviated, and thus the torque ripple phenomenon may be reduced.

Meanwhile, according to the present invention, the rotor may further include a weight loss recess 1325 and a rotor coupling hole 1326. The weight loss recess 1325 and the rotor coupling hole 1326 may be formed at a position between the rotating shaft coupling recess 1322 and the magnetic member accommodating recess 1323.

The weight loss recess 1325 may be formed to penetrate through the rotor 1320 along the axial direction to remove a dead volume and reduce a weight of the rotor 1320. The weight loss recess 1325 may be formed in plural along the outer direction. Here, the weight loss recess 1325 may be formed to be biased on any one side of the rotor 1320. In addition, the weight loss recess 1325 may be formed to partially penetrate through the rotor 1320.

For example, the weight loss recess 1325 may be formed on only one side of an imaginary straight line based on the cross-section of the rotor 1320. By such a structure, it is possible to compensate for the center of gravity of the rotating shaft 1130 which is biased as it is eccentrically coupled to the orbiting scroll 1162. Therefore, the balance weight 1140 may be omitted, and thus, a size of the back pressure chamber S3 may be reduced, thereby ultimately contributing to the compactness of the compressor. In addition, since the weight of the rotor 1320 is reduced, efficiency of the drive motor may be increased.

Meanwhile, the weight loss recess 1325 may be formed in a shape that may maintain rigidity of the rotor.

The rotor coupling hole 1326 is formed to penetrate through one end and the other end of the rotor 1320 in the axial direction. The rotor coupling hole 1326 may be formed in plural along the outer circumferential direction. Fastening members such as bolts and nuts may be mounted in the rotor coupling hole 1326 to maintain the structure of the rotor core 1321 formed by stacking a plurality of iron plates along an axial direction. That is, bolt heads and nuts may be disposed at one end and the other end of the rotor core 1321, respectively.

Hereinafter, the structure of the rotor 3320 will be described in detail with reference to the accompanying drawings.

Figure 8A:
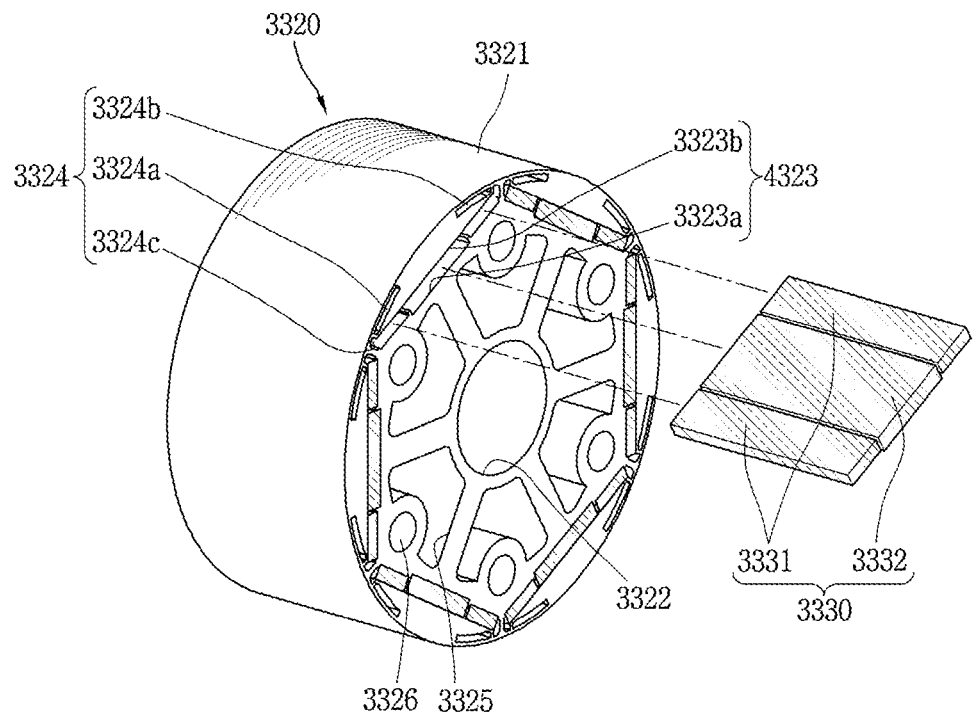
FIG. 8A is a perspective view of a rotor and a magnetic member separated according to another embodiment of the present invention.

FIG. 8A is a perspective view of a rotor and a magnetic member separated according to another embodiment of the present invention, and 8B is a front view of the magnetic member shown in FIG. 8A inserted into the rotor.

A rotor 3320 according to the present invention may be formed by stacking a plurality of iron plates formed in a circular shape as a whole in one direction. The rotor 3320 includes a rotating shaft accommodating recess 3322 into which the rotating shaft 1130 is inserted and coupled, a magnetic member accommodating recess 3323 into which a magnetic member 3330 such as a permanent magnet (hereinafter, referred to as a magnetic member) is inserted, and flux barriers 3324 formed on both sides of the magnetic member.

The rotating shaft accommodating recess 3322 is formed with the rotor 3320 at the center portion. The rotating shaft accommodating recess 3322 may be formed to penetrate through one end and the other end in the axial direction to accommodate the rotating shaft 1130. The rotating shaft accommodating recess 3322 may be formed as a cylindrical space having a circular cross-section so as to correspond to the shape of the cylindrical rotating shaft 1130.

However, the present invention is not limited thereto, and the rotating shaft accommodating recess 3322 and the drive motor coupling portion 1131 may be formed in a cross-section of a specific shape to prevent relative rotation between the rotor 3320 and the rotating shaft 1130. For example, the cross-section of the rotating shaft accommodating recess 3322 and the drive motor coupling portion 1131 may be formed to have an ellipse shape.

Meanwhile, the magnetic member 3330 is inserted into the magnetic member accommodating recess 3323. The magnetic member 3330 may be formed to have a length corresponding to an axial length of the rotor 3320. Accordingly, the magnetic member accommodating recess 3323 may be formed to penetrate through one end and the other end of the rotor 320 to accommodate the magnetic member 3330.

The magnetic member accommodating recess 3323 may be formed to be biased to the outer circumferential surface of the rotor 3320. The magnetic member accommodating recess 3323 may be formed to extend in a chord direction of the cross-section of the rotor 3320 formed in a circular shape. Here, the chord direction refers to a straight line connecting two points on the circumference of a circle and may mean a direction in which the line extends.

In other words, the magnetic member accommodating recess 3323 may be formed to extend in a second direction D2 perpendicular to a first direction D1 parallel to the radial direction at the center of the magnetic member accommodating recess 3323.

The magnetic member accommodating recess 3323 may be provided in plural along the circumferential direction of the rotor 3320. For example, the number of the magnetic member accommodating recess 3323 may be 4, 5, 6, or greater, and the magnetic member accommodating recess 3323 may be arranged in a polygonal shape inscribed in the cross-section of the rotor 3320 formed in a circular shape by the magnetic member accommodating recess 3323 extending in one direction.

The flux barriers 3324 are formed on both sides of the magnetic member accommodating recess 3323 to reduce torque ripple increased due to a magnetic flux concentrated by the magnetic member 3330.

The flux barriers 3324 may be formed to penetrate through one end and the other end of the rotor 3320 to correspond to the magnetic member inserted to penetrate through one end and the other end of the rotor 3320. The flux barriers 3324 include a first flux barrier 3324a and a second flux barrier 3324b formed at one side and the other side of the magnetic member accommodating recess 3323.

The first flux barrier 3324a and the second flux barrier 3324b extend in the circumferential direction so as to be close to each other at positions adjacent to one end and the other end of the magnetic member accommodating recess 3323, respectively. In this case, the first flux barrier 3324a and the second flux barrier 3324b may extend to be parallel to and along the outer circumference of the rotor 3320. In addition, a radial width W2 of the first flux barrier 3324a and the second flux barrier 3324b may extend uniformly.

Accordingly, an interval W1 between the first and second flux barriers 3324a and 3324b and the outer circumferential surface of the rotor 3320 may be kept constant.

Due to the structure of the flux barriers 3324, a magnetic flux density generated by the magnetic member 3330 may be concentrated on the center of the magnetic member 3330, not on the end of the magnetic member 3330. Accordingly, a high frequency component due to magnet flux may be reduced, and thus, core loss occurring in the drive motor 1300 may be reduced.

Meanwhile, a magnetic member such as a permanent magnet inserted into the rotor has a demagnetization characteristic that a magnetic flux is reduced by an influence of a use environment, temperature or external magnetic field, and the like. In the present invention, since the magnetic flux density is concentrated on the center portion of the magnetic member by the flux barriers 3324, a demagnetization internal force at the center portion of the magnetic member may be lower than demagnetization of both sides thereof.

That is, in consideration of the fact that both sides of the magnetic member 3330 disposed at the region where the flux barriers 3324 are disposed have excellent demagnetization characteristic as compared with the center portion of the magnetic member 330 disposed at the region where the flux barriers 3324 is not formed, the thickness of the both sides of the magnetic member 3330 may be reduced by a predetermined thickness.

However, if a ferromagnetic member is magnetized to make the magnetic member have a concavo-convex shape, results different from designed magnetic field characteristics may be obtained and a manufacturing cost for the magnetic member may increase.

According to the present invention, a plurality of magnetic members 3330 having different widths may be inserted into one magnetic member accommodating recess 3323. Referring to the drawings, the magnetic member 3330 may include a first magnetic member 3331 and a second magnetic member 3332. In the drawing, two first magnetic members and one second magnetic member are illustrated but the present invention is not limited thereto, and three or more magnetic members 3330 may be provided.

The first magnetic member 3331 may be provided in plural and disposed on both sides of the second magnetic member 3332, respectively. Here, at least a portion of the first magnetic member 3331 may radially overlap the first and second flux barriers 3324a and 3324b. More specifically, the first magnetic member 3331 may overlap the first and second flux barriers 3324a and 3324b in the first direction D1 parallel to the radial direction at the center of the magnetic member accommodating recess 3323.

In this case, the second magnetic member 3332 may be formed thicker than the first magnetic member 3331. A width MW2 of the second magnetic member 3332 in the first direction D1 is larger than a width MW1 of the first magnetic member 3331 in the first direction D1. Here, the first direction D1 is a direction parallel to the radial direction at the center of the magnetic member accommodating recess 3323.

In other words, the magnetic member 3330 may include the first magnetic member 3331 at least partially overlapping the flux barriers 3324 in the radial direction and the second magnetic member 3332 formed thicker than the first magnetic member 3331.

That is, the width MW1 of the first magnetic member 3331 is formed to be smaller than the width of the magnetic member in the case of the existing single bar type and the width MW2 of the second magnetic member 3332. As a result, a usage amount of the permanent magnet may be reduced by the difference between the width MW1 of the first magnetic member 3331 and the width MW2 of the second magnetic member 3332, and therefore, a manufacturing cost of the drive motor may be reduced, without lowering performance of the drive motor 1300.

TABLE 1

|  | Existing technology | Present invention |
| --- | --- | --- |
| Thickness of magnet [mm] | 2.5 | First magnetic member: 2.5 Second magnetic member: 2.0 |
| Usage amount of magnet [g] | 85.12 | 73.61 |

Referring to Table 1, with respect to performance of the same drive motor 1300, in the present invention, the usage amount of the magnet may be reduced by about 13% compared to the existing technology of the single bar type.

In addition, the eddy current inside the magnet occurring when the drive motor 1300 is driven may be reduced due to the division of the magnet, thereby reducing iron loss of the drive motor 1300.

Meanwhile, any one surface of the magnetic member accommodating recess 3323 accommodating the first magnetic member 3331 and the second magnetic member 3332 which are different in width from each other may be formed to be stepped. This will be described in detail hereinafter.

The magnetic member accommodating recess 3323 includes an inner side surface 3323a and an outer side surface 3323b formed to face each other. The inner side surface 3323a and the outer side surface 3323b extend along the second direction D2 perpendicular to the first direction D1. The inner side surface 3323a may be a surface adjacent to the rotating shaft accommodating recess 3322 and the outer side surface 3323b may be a surface adjacent to the outer circumferential surface. In addition, the second direction D2 may be perpendicular to the first direction D1.

Figure 8B:
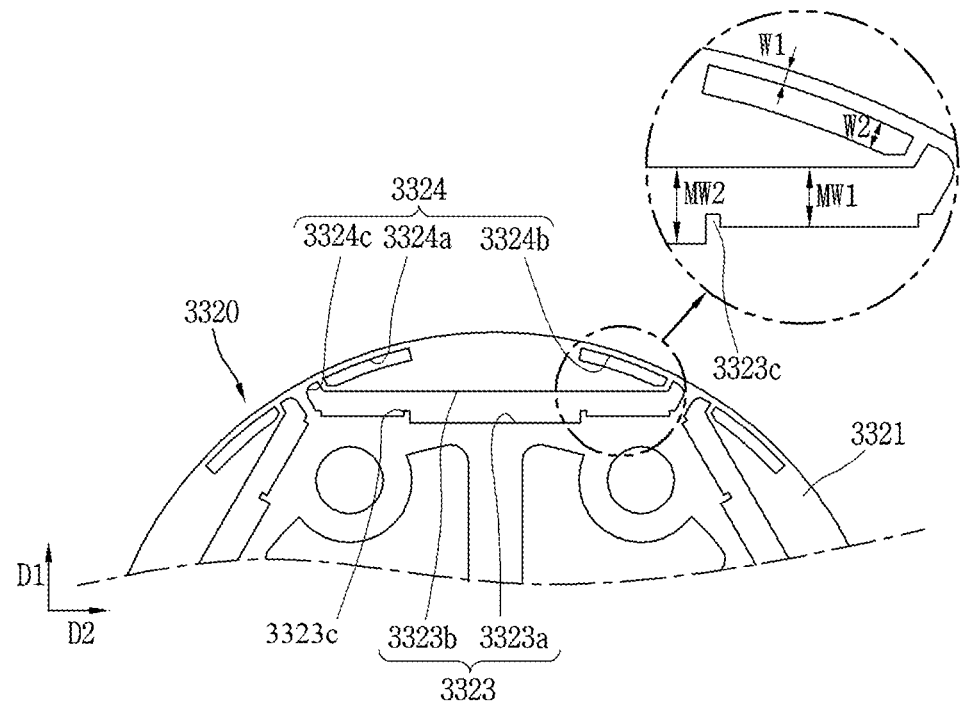
FIG. 8B is a front view of the rotor shown in FIG. 8A.

Here, the inner side surface 3323a and the outer side surface 3323b may be formed to cover one surface and the other surface of the magnetic member 3330. Specifically, the outer side surface 3323b may extend flat along the second direction D2. That is, as shown in FIG. 8B, when one end of the rotor 3320 is viewed from above, the outer side surface 3323b may extend along the second direction D2 to form a straight line.

Here, one surface of the first magnetic member 3331 and one surface of the second magnetic member 3332 are in contact with the outer side surface 3323b. Accordingly, one surface of the first magnetic member 3331 and one surface of the second magnetic member 3332 are aligned in the second direction D2 along the inner side surface 3323a. In this case, the other surfaces of the first magnetic member 3331 and the second magnetic member 3332 are stepped. As shown in FIG. 8B, when the end portion of the rotor 3320 is viewed from above, the first magnetic member 3331 and the second magnetic member 3332 are arranged to have a concavo-convex shape.

Accordingly, the inner side surface 3323a which contacts the other surfaces of the first magnetic member 3331 and the second magnetic member 3332 may be stepped along the second direction D2. In other words, a region in contact with the second magnetic member 3332 on the inner side surface 3323a may have a recessed shape in the center direction of the rotor 3320.

Due to the structure of the magnetic member accommodating recess 3323, the first magnetic member 3331 and the second magnetic member 3332 formed of separate members may be firmly supported so that vibration does not occur even when the rotor 3320 is rotated.

Meanwhile, the magnetic members 3330 may be disposed so that the poles cross each other in the circumferential direction at each of the magnetic member insertion recess 3323 disposed in the circumferential direction. However, the first magnetic member 3331 and the second magnetic member 3332 inserted into one magnetic member insertion recess 3323 are disposed in the same pole direction. In this case, the first magnetic member 3331 and the second magnetic member 3332 may be spaced apart from each other by a repulsive force therebetween.

However, the first magnetic member 3331 and the second magnetic member 3332 overcome the repulsive force between each other by an inertia of the rotation of the rotor 3320. In this case, demagnetization is intensified due to mutual magnetic flux and a collision occurs. As a result, portions separated by the collision and breakage between the first magnetic member 3331 and the second magnetic member 3332 may circulate with the refrigerant and damage internal components of the compressor including the scroll.

Referring back to FIG. 8A and, according to an embodiment of the present invention, the first magnetic member 3331 and the second magnetic member 3332 are inserted into the recess 3322 and spaced apart from each other in the second direction D2. Here, a spacing protrusion 3322c protruding in the first direction D1 may be formed on the inner side surface 3323a of the magnetic member accommodating recess 3323. The spacing protrusion 3323c is disposed between the first magnetic member 3331 and the second magnetic member 3332 to suppress mutual approach.

In addition, the spacing protrusion 3323c protrudes from the rotor 3320 and thus may be formed of the same metal material as the rotor 3320. In this case, a density of the magnetic flux by the magnetic member 3330 increases in the spacing protrusion 3323c, which may intensify demagnetization. Therefore, the spacing protrusion 3323c preferably protrudes under the center of the width MW2 of the first magnetic member 3323. That is, a protruding length of the spacing protrusion 3323c may be less than half the length of the width MW2 of the first magnetic member 3323.

As shown in FIG. 8B, the spacing protrusion 3323c is shown to protrude from the inner side surface 3323a, but may protrude from the outer side surface 3323b. However, if the spacing protrusion 3323c protrudes from the outer side surface 3323b, the spacing protrusion 3323c may be affected by a magnetic flux based on the stator 3310, and therefore, the spacing protrusion 3323c preferably protrudes from the inner side surface 3323a.

Figure 9:
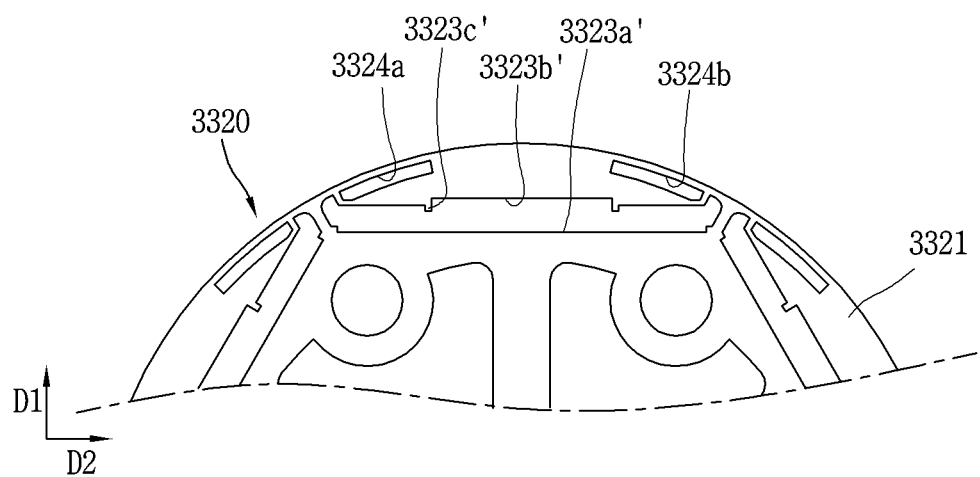
FIG. 9 is a modification of the embodiment shown in FIG. 8B.

FIG. 9 shows a modification of the embodiment shown in FIG. 8B.

Referring to FIG. 9, the first magnetic member 3331 and the second magnetic member 3332 may be aligned as opposed to the embodiment described above.

In the present embodiment, the inner side surface 3323a' may be formed to form a straight line, and the outer side surface 3323b' may be formed to be stepped. Accordingly, the other surfaces of the first magnetic member 3331 and the second magnetic member 3332 in contact with the inner side surface 3323a' may be aligned in the second direction D2 along the inner side surface 3323a'. That is, the second magnetic member 3332 may be disposed to have a shape protruding in the radial direction of the rotor 3320 relative to the first magnetic member 3331.

That is, the first magnetic member 3331 and the second magnetic member 3332 may be disposed to be opposite with respect to the arrangement of the first magnetic member 3331 and the second magnetic member 3332 and the center line based on the second direction D2 illustrated in FIGS. 8A and 8B.

In this case, as the second magnetic member 3331 protrudes, an interval to the flux barriers 3324 may be narrowed. Accordingly, a density of the magnetic flux of the stator 3310 facing the first magnetic member 3331 may be further reduced, so that the demagnetization characteristics of the first magnetic member 3331 may be further improved. Therefore, the thickness of the first magnetic member 3331 may be further reduced.

Figure 10:
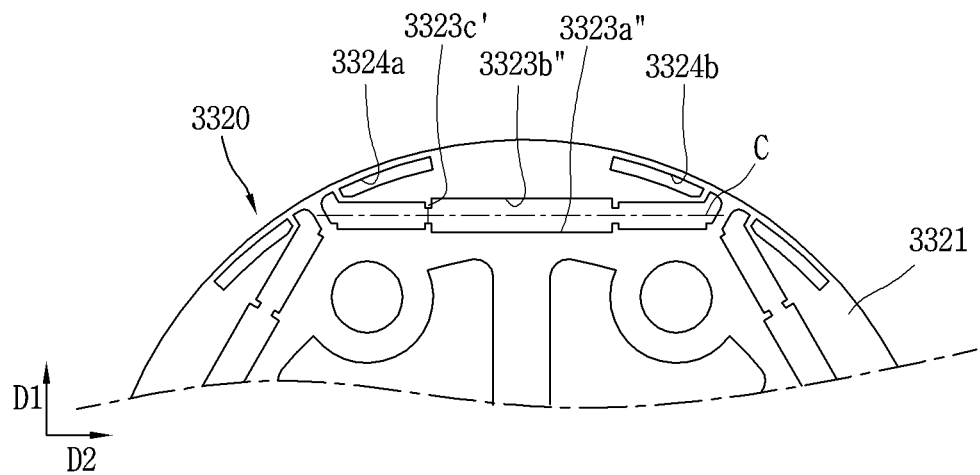
FIG. 10 is another modification of the embodiment shown in FIG. 8B.

FIG. 10 shows another modification of the embodiment shown in FIG. 8B.

In the present embodiment, the first magnetic member 3331 and the second magnetic member 3332 may be disposed such that the centers of the widths MW1 and MW2 are aligned along the second direction D2. In this case, both the inner side surface 3323a" and the outer side surface 3323b" in contact with one surface and the other surface of the first magnetic member 3331 and the second magnetic member 3332 may be formed stepped. That is, as illustrated, the centers of the first magnetic member 3331 and the second magnetic member 3332 may be aligned along the center line C.

However, the arrangement of the first and second magnetic members 3331 and 3332 is not limited to the embodiment described above and may be variously considered in consideration of magnetic flux characteristics when designing the rotor 3320.

Figure 11A:
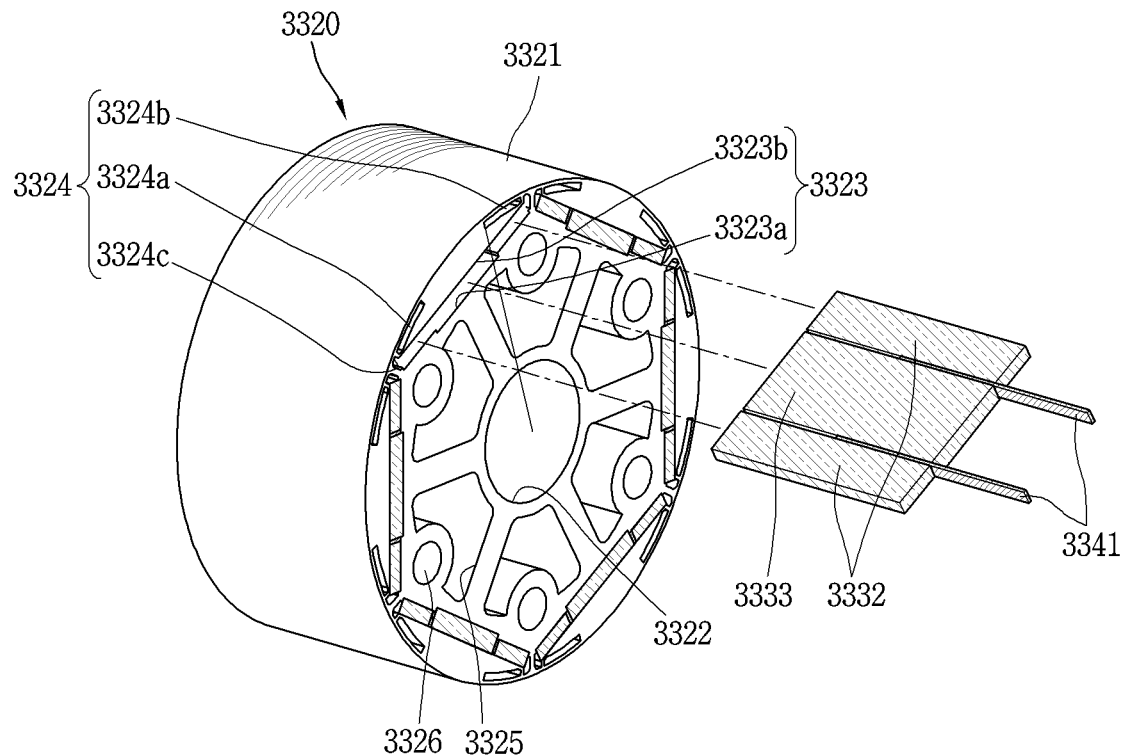
FIG. 11A is a perspective view of a rotor and a magnetic member separated according to another embodiment of the present invention.
Figure 11B:
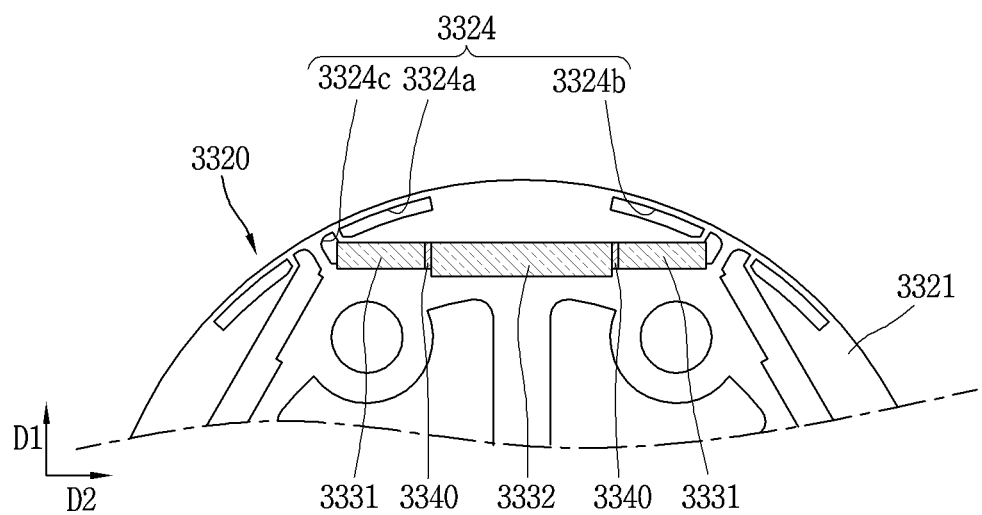
FIG. 11B is a front view of the rotor shown in FIG. 11A.

FIG. 11A is a perspective view of a rotor and a magnetic member separated according to another embodiment of the present invention, and FIG. 11B is a front view of the rotor shown in FIG. 11A.

Referring to the drawing, the drive motor 1300 may further include a spacing member 3340 disposed between the first magnetic member 3331 and the second magnetic member 3332.

The spacing member 3340 may be formed to extend in the axial direction. The spacing member 3340 may be formed to correspond to the axial length of the rotor 3320. A length of the spacing member 3340 in the first direction D1 may be substantially equal to a distance between the first magnetic member 3310 and the second magnetic member 3320. In addition, a length of the spacing member 3340 in the second direction D2 may be substantially the same as a distance between the inner side surface 3323b and the outer side surface 3323a.

That is, the spacing member 3340 may be formed to fill a space between the first magnetic member 3331 and the second magnetic member 3332.

The spacing member 3340 may be formed of a non-magnetic material or paramagnetic material so as not to be utilized as a path of magnetic flux. For example, the spacing member 3340 may be formed of a nonferrous metal. In addition, the spacing member 3340 may be formed of a polymer material. When the spacing member 3340 is formed of a polymer material, the spacing member 3340 may have a preset elastic force. Accordingly, as the rotor 3320 rotates, an impact due to movement of the first magnetic member 3331 and/or the second magnetic member 3332 in the second direction D2 may be alleviated.

According to the present invention, the spacing member 3340 and the aforementioned spacing protrusion 3323c may be simultaneously formed.

Meanwhile, referring back to FIGS. 11A and 11B, the flux barriers 3324 may further include a third flux barrier 3324c.

The third flux barrier 3324c may be formed on both sides of the magnetic member accommodating recess 3323 and may communicate with both ends of the magnetic member accommodating recess 3323, respectively. As the third flux barrier 3324c communicates with both ends of the magnetic member accommodating recess 3323, both ends of the magnetic member 3330 may be exposed to a space formed by the third flux barrier 3324c.

The third flux barrier 3324c may be formed to extend to the outer circumferential surface by a certain extent. Here, at least a portion of the third flux barrier 3324c may overlap the first flux barrier 3324a and/or the second flux barrier 3324b along the circumferential direction.

Here, the third flux barrier 3324c may be formed to be spaced apart from the first flux barrier 3324a and/or the second flux barrier 3324b in the circumferential direction by a preset interval. That is, ribs extending along the circumferential direction are formed between the first flux barrier 3324a and/or the second flux barrier 3324b and the third flux barrier 3324c.

Figure 12:
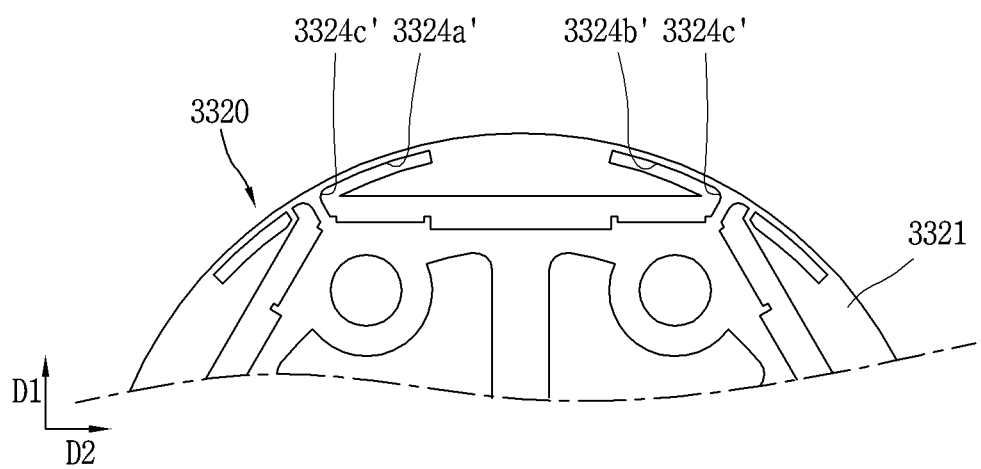
FIG. 12 is a front view of a rotor according to another embodiment of the present invention.

FIG. 12 is a cross-sectional view of a rotor according to still another embodiment of the present invention.

Referring to FIG. 12, in the present embodiment, a third flux barrier 3324c' may be formed to communicate with the first flux barrier 3324a and the second flux barrier 3324b. That is, the flux barriers 3324 is formed to surround one end and the other end of each of the first magnetic members 3331 disposed on both sides of the second magnetic member 3332 and extend along the radial and circumferential directions.

Figure 13:
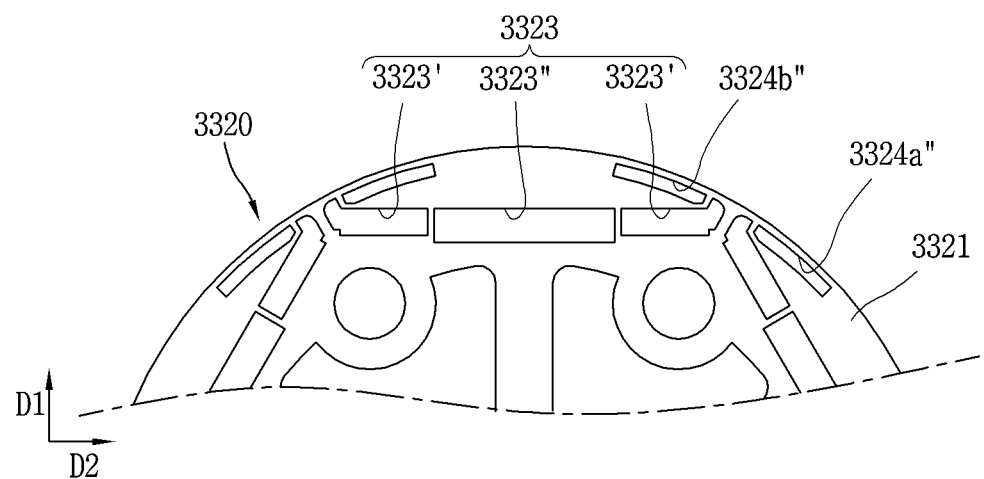
FIG. 13 is a front view of a rotor according to another embodiment of the present invention.

FIG. 13 is a cross-sectional view of a rotor according to still another embodiment of the present invention.

Referring to FIG. 13, the magnetic member accommodating recess 3323 may include a first magnetic member accommodating recess 3323' and a second magnetic member accommodating recess 3323" spaced apart from each other in the second direction D2. The first magnetic member 3331 may be accommodated in the first magnetic member accommodating recess 3323' and the second magnetic member 3332 may be accommodated in the second magnetic member accommodating recess 3323".

Meanwhile, according to the present invention, the rotor may further includes the weight loss recess 3324 and the refrigerant guide recess 3325. The weight loss recess 3324 and the refrigerant guide recess 3325 may be formed at a position between the rotating shaft coupling recess 3321 and the magnetic member accommodating recess 3323.

The weight loss recess 3324 may be formed to penetrate through the rotor 3320 along the axial direction so as to remove a dead volume to reduce a weight of the rotor 3320. The weight loss recess 3324 may be formed in plural along the outer direction. Here, the weight loss recess 3324 may be formed to be biased on any one side of the rotor 3320. In addition, the weight loss recess 3324 may be formed to partially penetrate through the rotor 3320.

For example, the weight loss recess 3324 may be formed on only one side of an imaginary straight line dividing a cross-section of the rotor 3320. By such a structure, it is possible to compensate for the center of gravity of the rotating shaft 1130 biased as the rotating shaft 1130 is eccentrically coupled to the orbiting scroll 1162. Therefore, the balance weight 1140 may be omitted, and thus, the size of the back pressure chamber S3 may be reduced, thereby ultimately contributing to compactness of the compressor. In addition, since the weight of the rotor 3320 is reduced, efficiency of the drive motor may be increased.

Meanwhile, the weight loss recess 3324 may be formed in a shape that may maintain rigidity of the rotor.

The refrigerant guide recess 3325 is formed to penetrate through one end and the other end of the rotor 3320 in the axial direction. The refrigerant guide recess 3325 may be formed in plural along the outer circumferential direction. The refrigerant flowing in through the intake port 1111 by the refrigerant guide recess 3325 and the air gap between the stator 3310 and the rotor 3320 described above and located on a front side of the drive motor 1300 may move to the rear side of the drive motor 1300 through the refrigerant guide recess 3325 and the air gap. In this case, heat generated when the drive motor 1300 is driven may be cooled, and a contact area between the refrigerant, the stator 3310, and the rotor 3320 is increased to effectively cool heat generated when the drive motor 1300 is driven.

Figure 14:
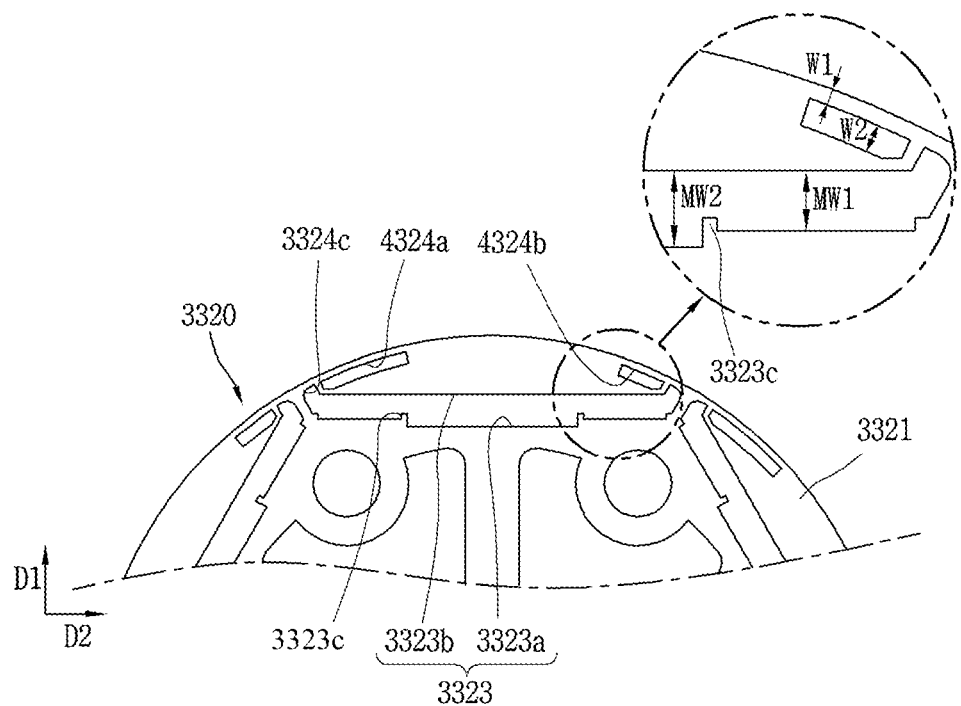
FIG. 14 is another modification of the embodiment shown in FIG. 8B.
Figure 15:
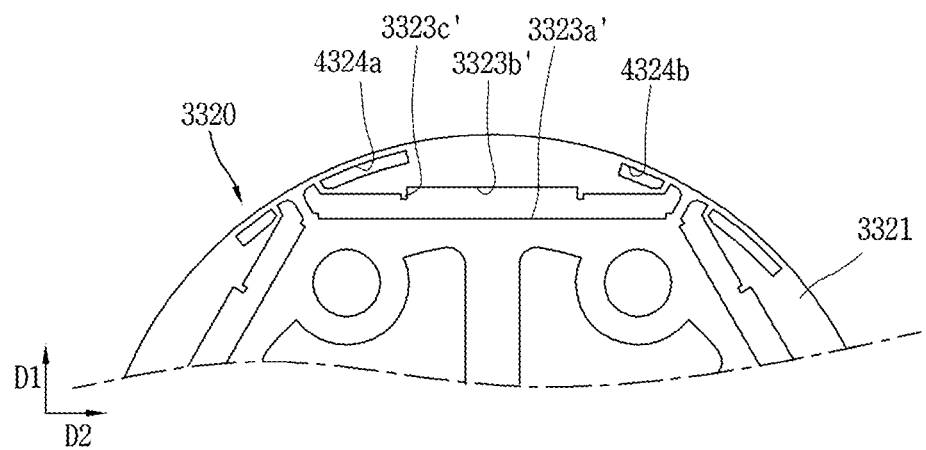
FIG. 15 is a modification of the embodiment shown in FIG. 9.
Figure 16:
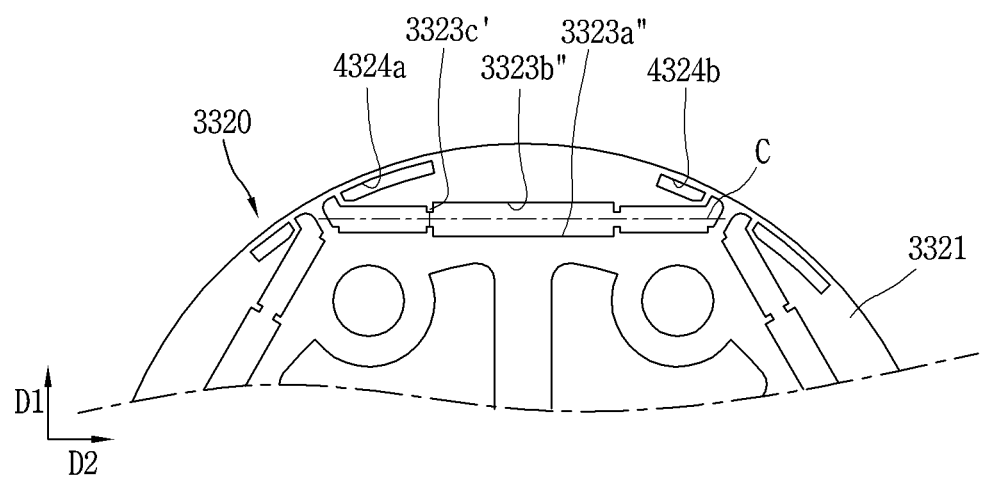
FIG. 16 is a modification of the embodiment shown in FIG. 10.
Figure 17:
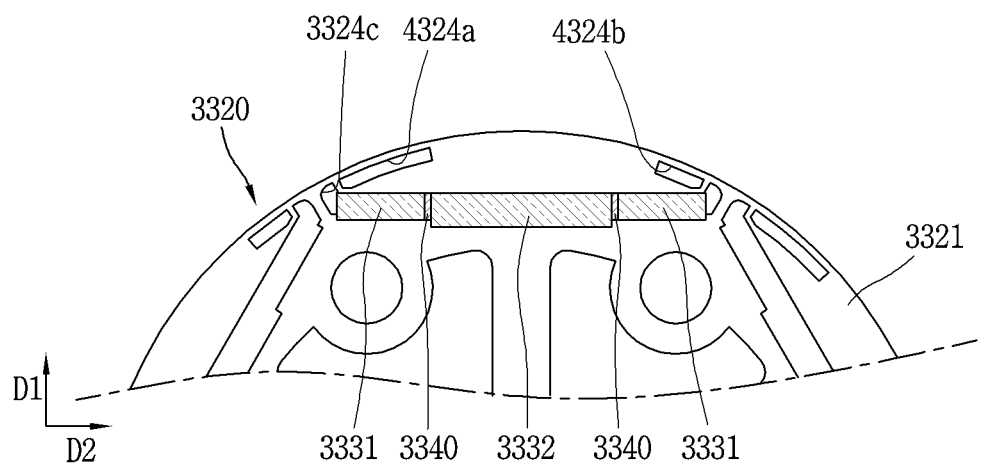
FIG. 17 is a modification of the embodiment shown in FIG. 11A.

FIG. 14 shows another modification of the embodiment shown in FIG. 8B, FIG. 15 shows a modification of the embodiment shown in FIG. 9, FIG. 16 shows a modification of the embodiment shown in FIG. 10, and FIG. 17 shows a modification of the embodiment shown in FIG. 11A.

Referring to FIGS. 14, 15, 16, and 17, the first flux barrier 4324*a* and the second flux barrier 4324*b* are formed to have different lengths. That is, the first flux barrier 4324*a* may be formed longer than the second flux barrier 4324*b*. Effects thereof are the same as described in FIGS. 5, 6A and 6B.

In addition, the first flux barrier 4324*a* may be formed shorter than the second flux barrier 4324*b*. Effect thereof are the same as described with reference to FIGS. 7A and 7B.

Figure 18:
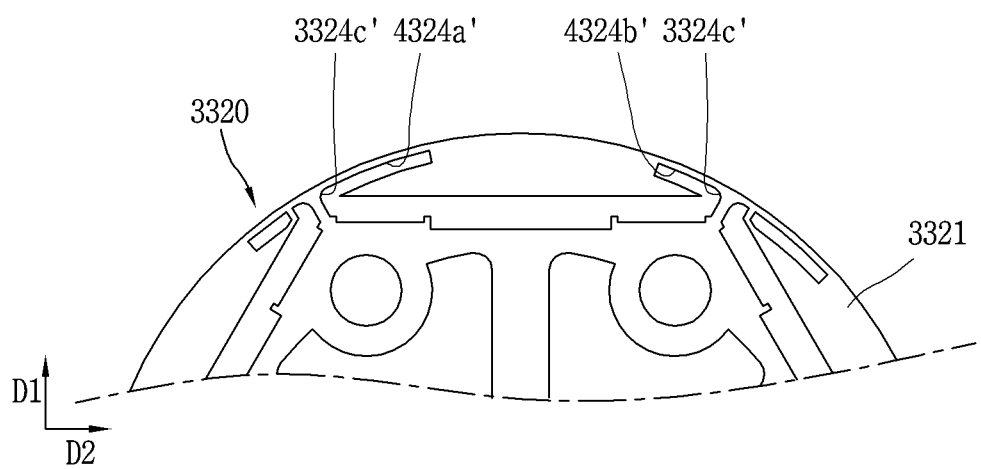
FIG. 18 is a modification of the embodiment shown in FIG. 12.

FIG. 18 shows a modification of the embodiment shown in FIG. 12.

Referring to FIG. 18, the first flux barrier 4324*a'* and the second flux barrier 4324*b'* are formed to have different lengths. That is, the first flux barrier 4324*a'* may be formed longer than the second flux barrier 4324*b'*. Effects thereof are the same as described in FIGS. 5, 6A and 6B.

In addition, the first flux barrier 4324*a'* may be formed shorter than the second flux barrier 4324*b'*. Effects thereof are the same as described with reference to FIGS. 7A and 7B.

Figure 19:
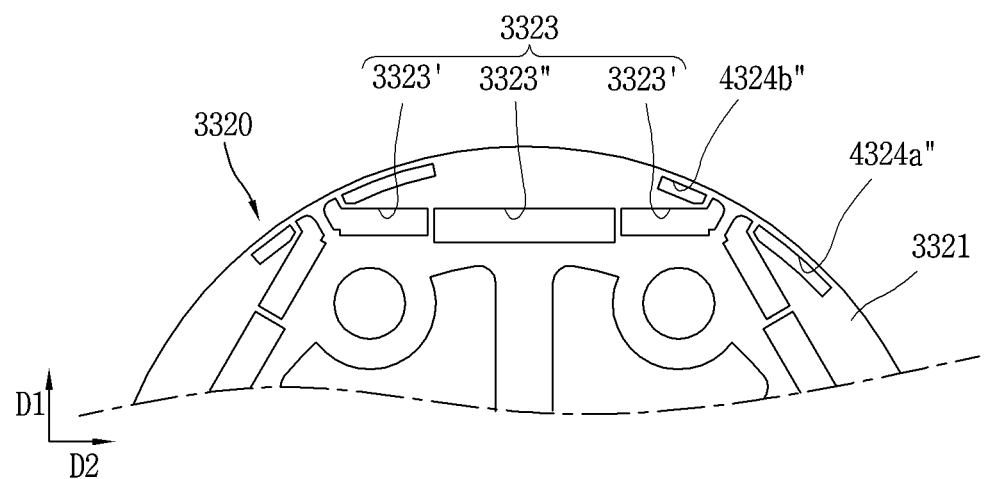
FIG. 19 is a modification of the embodiment shown in FIG. 13.

FIG. 19 shows a modification of the embodiment shown in FIG. 13.

Referring to FIG. 19, a first flux barrier 4324*a"* and a second flux barrier 4324*b"* are formed to have different lengths. That is, the first flux barrier 4324*a"* may be formed longer than the second flux barrier 4324*b"*. Effects thereof are the same as described in FIGS. 5, 6A and 6B.

In addition, the first flux barrier 4324*a"* may be formed shorter than the second flux barrier 4324*b"*. Effects thereof are the same as described with reference to FIGS. 7A and 7B.

The foregoing embodiments are merely illustrative to practice the driving motor and the motor-operated compressor having the same according to the present disclosure. Therefore, the present disclosure is not limited to the above-described embodiments, and it will be understood by those of ordinary skill in the art that various changes in form and details may be made therein without departing from the scope of the present disclosure.

What is claimed is:

1. A drive motor comprising:
a stator that defines an accommodating space therein; and
a rotor rotatably disposed in the accommodating space and configured to be rotated by a magnetic interaction with the stator,
wherein the rotor comprises:
a magnetic portion,
a rotor core that accommodates the magnetic portion, and
a first flux barrier and a second flux barrier that penetrate through the rotor core and that extend along a circumferential direction of the rotor core, the first flux barrier facing a first side of the magnetic portion, and the second flux barrier facing a second side of the magnetic portion,
wherein a length of the first flux barrier and a length of the second flux barrier are different from each other,
wherein the rotor defines an insertion recess that is configured to receive the magnetic portion and that is disposed adjacent to the first and second flux barriers,
wherein the magnetic portion comprises:
first magnetic members that at least partially overlap with the first and second flux barriers in a radial direction of the rotor, respectively, each of the first magnetic members having an outer surface and an inner surface that is disposed radially inward relative to the outer surface, and
a second magnetic member, a thickness of the second magnetic member being greater than a thickness of the first magnetic members, the second magnetic member having an outer surface and an inner surface that is disposed radially inward relative to the outer surface of the second magnetic member,
wherein the first magnetic members and the second magnetic member are arranged along a straight line that is orthogonal to the radial direction of the rotor,
wherein the outer surface of the second magnetic member protrudes toward an outer circumferential surface of the rotor relative to the outer surface of each of the first magnetic members,
wherein the inner surface of the second magnetic member protrudes opposite to the outer circumferential surface of the rotor relative to the inner surface of each of the first magnetic members,
wherein the insertion recess has (i) an outer surface that faces the outer surfaces of the first and second magnetic members in the radial direction and (ii) an inner surface that faces the inner surfaces of the first and second magnetic members in the radial direction,
wherein the rotor further comprises spacing protrusions that protrude toward both of the inner and outer surfaces of the insertion recess, each of the spacing protrusions being disposed between one of the first magnetic members and the second magnetic member, wherein each of the first and second flux barriers is spaced apart from the insertion recess along a rotation direction of the rotor, and wherein an interval between the outer circumferential surface of the rotor and an outer surface of each of the first and second flux barriers is maintained to be less than a radial width of each of the first and second flux barriers along the outer surface of each of the first and second flux barriers.

2. The drive motor of claim 1, wherein:

the first flux barrier and the second flux barrier are alternately arranged along the rotation direction of the rotor, the first flux barrier extends along the rotation direction of the rotor, and the second flux barrier extends in a direction opposite to the rotation direction of the rotor.

3. The drive motor of claim 1, wherein:

the thickness of the second magnetic member in a first direction parallel to the radial direction is greater than the thickness of the first magnetic members in the first direction, and the insertion recess extends in a second direction perpendicular to the first direction.

4. The drive motor of claim 3, wherein:

the first magnetic members are disposed at both sides of the second magnetic member, the insertion recess comprises:

first regions configured to receive the first magnetic members, respectively, each of the first regions having a first width in the first direction corresponding to the thickness of the first magnetic members, and a second region configured to receive the second magnetic member, the second region having a second width in the first direction corresponding to the thickness of the second magnetic member, the second width in the first direction is greater than the first width in the first direction, and each of the first magnetic members is spaced apart from the second magnetic member.

5. The drive motor of claim 1, wherein the straight line defines a center line between the inner and outer surfaces of the insertion recess.

6. The drive motor of claim 1, wherein a shape of the insertion recess corresponds to shapes of the first magnetic members, the second magnetic member, and the spacing protrusions.

* * * * *